US012556648B2

(12) United States Patent
Tanaka et al.

(10) Patent No.: US 12,556,648 B2
(45) Date of Patent: Feb. 17, 2026

(54) IMAGE DISPLAY APPARATUS AND METHOD

(71) Applicant: MAXELL, LTD., Kyoto (JP)

(72) Inventors: Kazuhiko Tanaka, Tokyo (JP); Mitsuo Nakajima, Kyoto (JP); Haruhiko Higuchi, Tokyo (JP)

(73) Assignee: MAXELL, LTD., Kyoto (JP)

( * ) Notice: Subject to any disclaimer, the term of this patent is extended or adjusted under 35 U.S.C. 154(b) by 28 days.

(21) Appl. No.: 18/774,154

(22) Filed: Jul. 16, 2024

(65) Prior Publication Data

US 2024/0372962 A1    Nov. 7, 2024

Related U.S. Application Data

(63) Continuation of application No. 17/422,909, filed as application No. PCT/JP2019/049520 on Dec. 18, 2019, now Pat. No. 12,075,186.

(30) Foreign Application Priority Data

Jan. 23, 2019    (JP) ................. 2019-009015

(51) Int. Cl.
*H04N 5/74*    (2006.01)
*G03B 21/14*    (2006.01)

(52) U.S. Cl.
CPC ......... *H04N 5/7408* (2013.01); *G03B 21/147* (2013.01)

(58) Field of Classification Search
CPC .. H04N 5/7408; H04N 9/3194; H04N 9/3185; G03B 21/147; G03B 21/142; G09G 5/00; G09G 5/36

(Continued)

(56) References Cited

U.S. PATENT DOCUMENTS 5,329,310 A    7/1994    Liljegren
6,377,277 B1 *    4/2002    Yamamoto .............. A63F 13/57
                                                              345/629

(Continued)

FOREIGN PATENT DOCUMENTS

JP    2001-083949 A    3/2001
JP    2011-103534 A    5/2011
JP    2013-207615 A    10/2013

OTHER PUBLICATIONS

Toru Takahashi, et al., "A Study on Geometric Correction for Projected images Based on 3D Measurement", IEICE Technical Report, vol. 107, No. 289, Oct. 18, 2007, p. 71-76.

(Continued)

*Primary Examiner* — Magda Cruz
(74) *Attorney, Agent, or Firm* — Mattingly & Malur, PC

(57) ABSTRACT

A technology capable of suitably correcting a geometric distortion caused by a shape of a curved surface of a screen or the like and obtaining a suitable image easily viewable for a user is provided. A projector is an image display apparatus configured to project an image onto a screen and includes a projection lens arranged at a first position and a camera arranged at a second position. When the screen has a curved surface, a camera image obtained by capturing a first image projected on the screen by the camera is acquired, and a geometric transformation for correcting a geometric distortion caused by the curved surface seen from a first virtual viewpoint position (virtual viewpoint) is performed for an image to be displayed based on information of the camera image, the first position, and the second position, and a post-transformation image is projected onto the screen.

12 Claims, 21 Drawing Sheets

(58) Field of Classification Search
USPC .......................................... 353/69; 348/744
See application file for complete search history.

(56) References Cited

U.S. PATENT DOCUMENTS

| | | | |
|---|---|---|---|
| 8,730,130 B1 | 5/2014 | Pray | |
| 2013/0141593 A1 | 6/2013 | Bassi | |
| 2013/0194554 A1* | 8/2013 | Aruga | G03B 21/005 |
| | | | 353/121 |
| 2013/0257702 A1 | 10/2013 | Ozeki | |
| 2014/0313423 A1* | 10/2014 | Johnson | H04N 9/3194 |
| | | | 348/745 |
| 2016/0346693 A1* | 12/2016 | Minato | G09G 5/38 |
| 2017/0351324 A1* | 12/2017 | Njolstad | G06F 3/0425 |
| 2022/0006989 A1* | 1/2022 | Beier | H04N 9/3147 |

OTHER PUBLICATIONS

International Search Report of PCT/JP2019/049520 dated Mar. 20, 2020.
Japanese Office Action received in corresponding Japanese Application No. 2019-009015 dated Sep. 27, 2022.

* cited by examiner

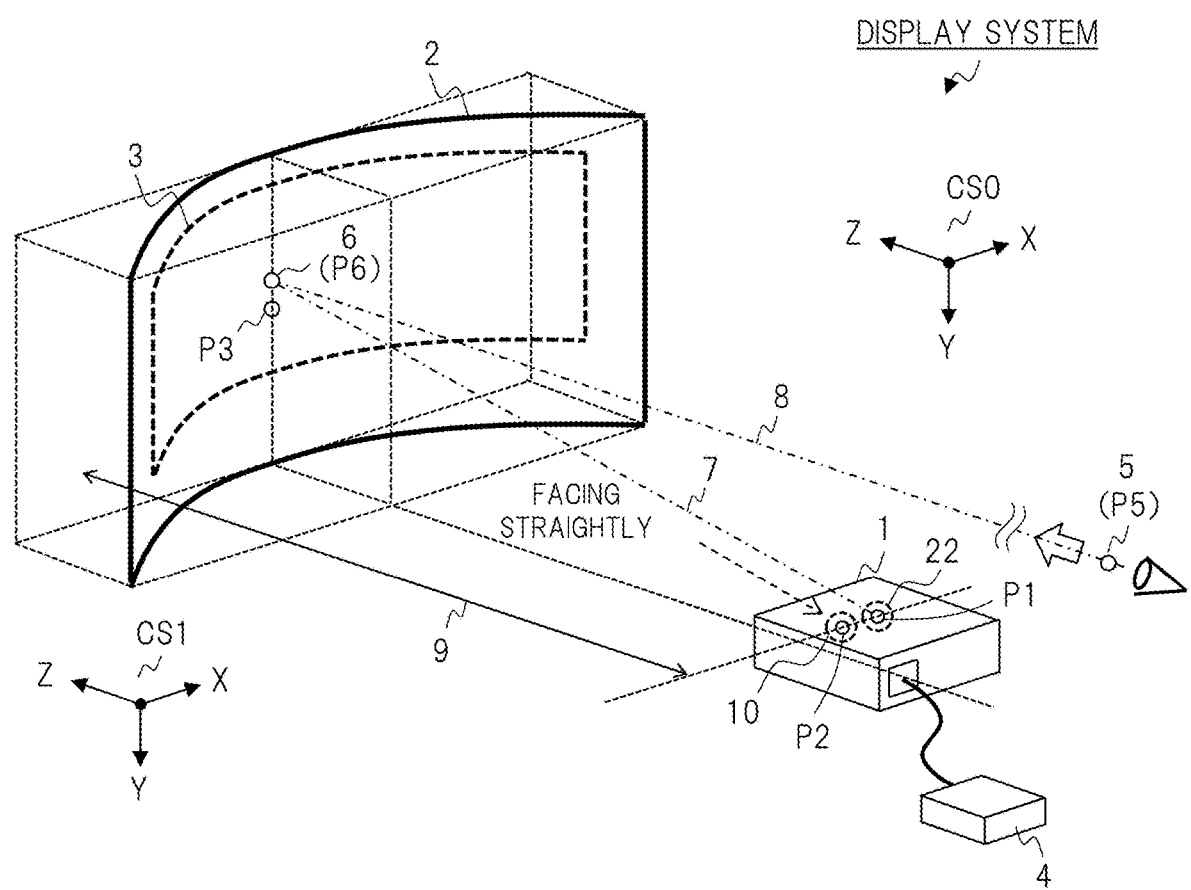

FIG. 4
PATTERN IMAGE 101
(1) GRAY CODE PATTERN
g1 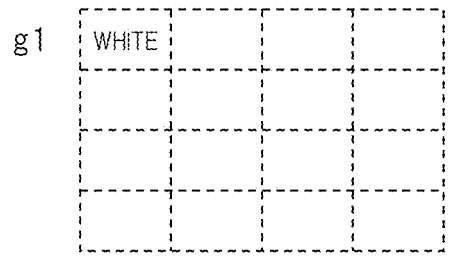 g2 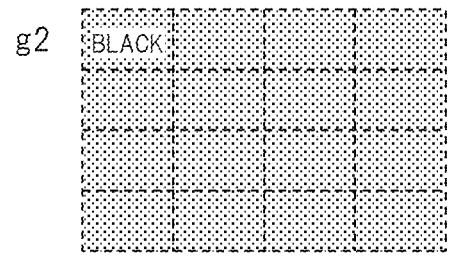
g3 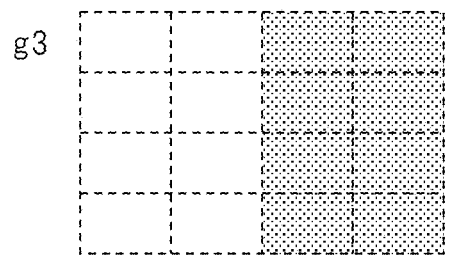 g4 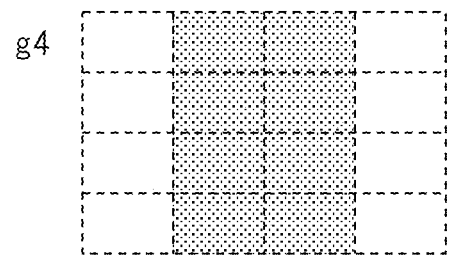
g5 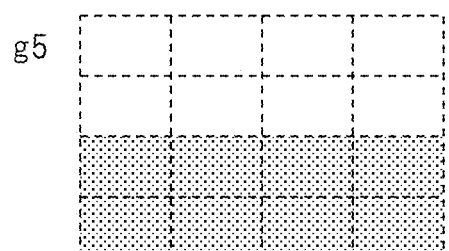 g6 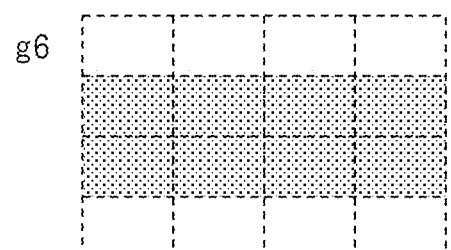
(2) CHECKER PATTERN 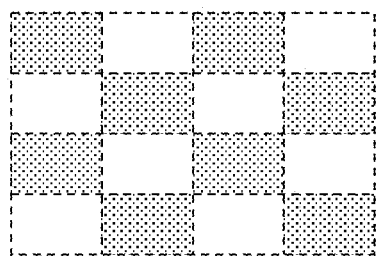
(3) DOT PATTERN 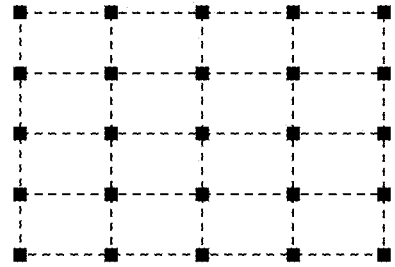

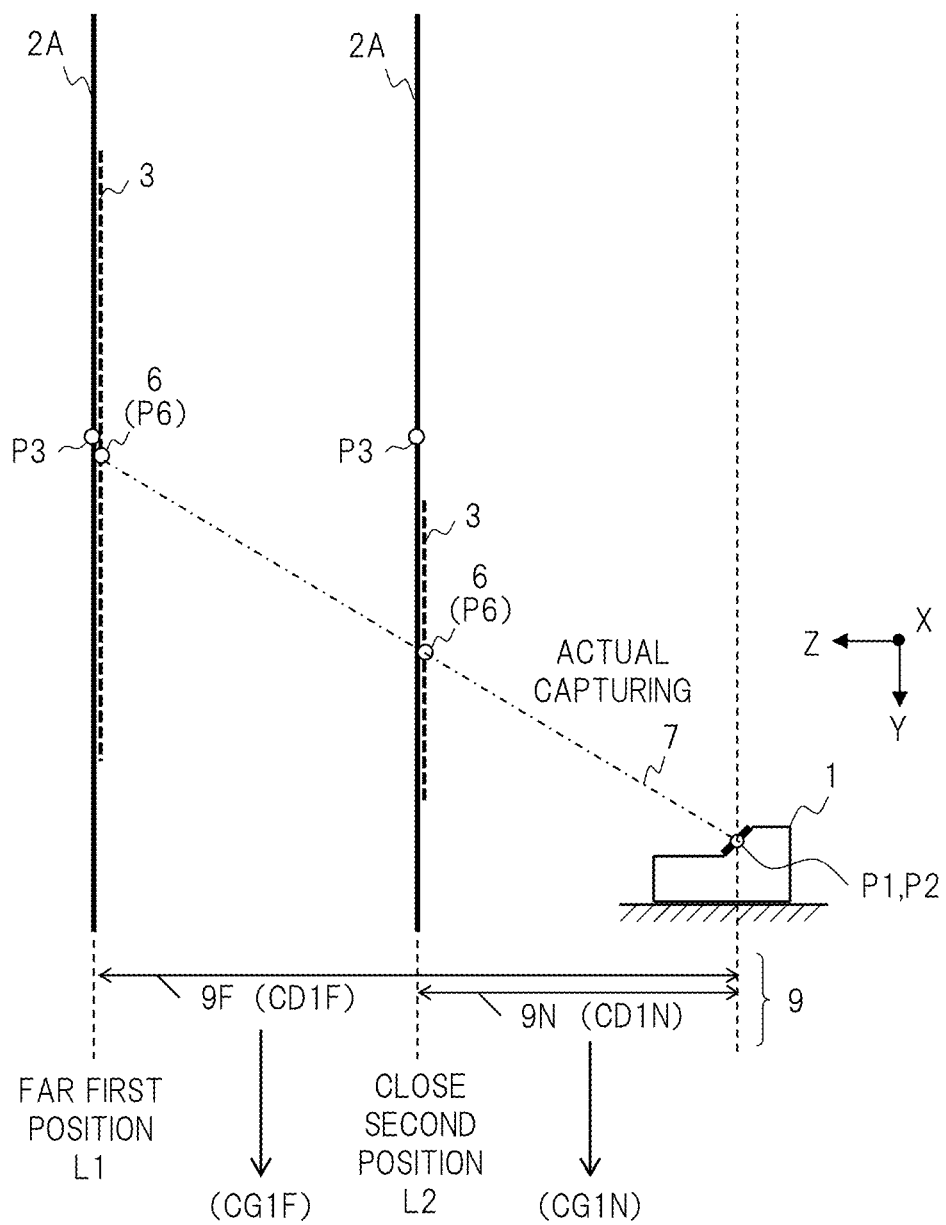

| FIG. 12(A) | FIG. 12(B) |
|---|---|
| CASE OF FAR FIRST POSITION L1 | CASE OF CLOSE SECOND POSITION L2 |
CASE OF REAL CAMERA IMAGE 120
120F
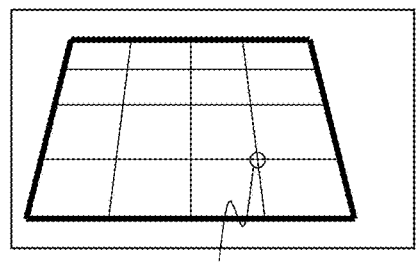
CG1F COORDINATES (CG1Fx, CG1Fy)
120N
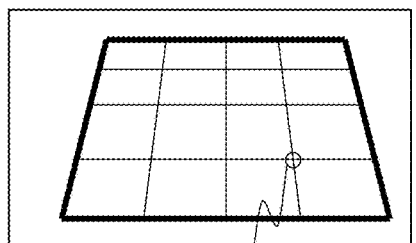
CG1N COORDINATES (CG1Nx, CG1Ny)
CASE OF VIRTUAL CAMERA IMAGE 140
140F
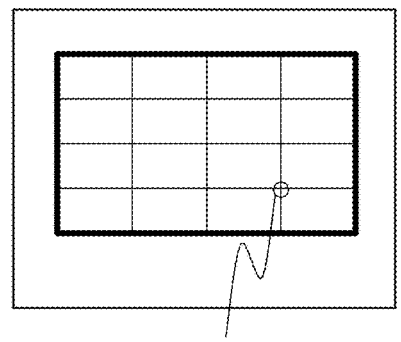
VG1F COORDINATES (VG1Fx, VG1Fy)
140N
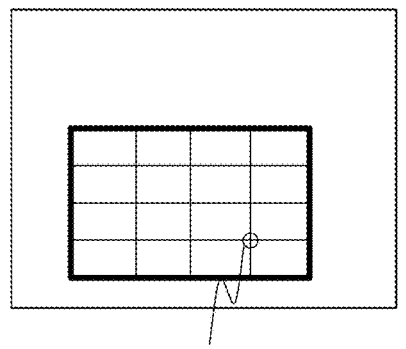
VG1N COORDINATES (VG1Nx, VG1Ny)

FIG. 17
SETTING MENU
[DISTORTION ADJUSTMENT]
◎ VERTICAL (X)    SLIDE BAR OPERATION
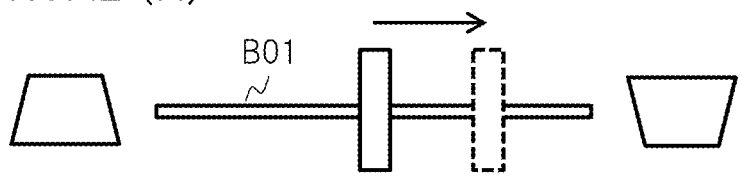
○ HORIZONTAL (Y)
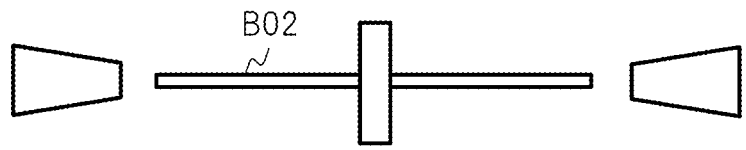
○ ROTATIONAL (Z)
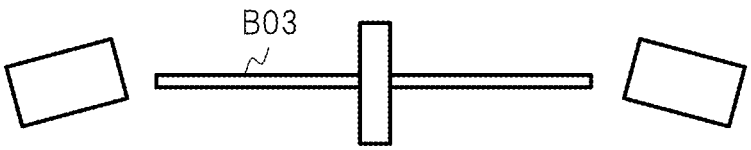
OK    CANCEL FIG. 19
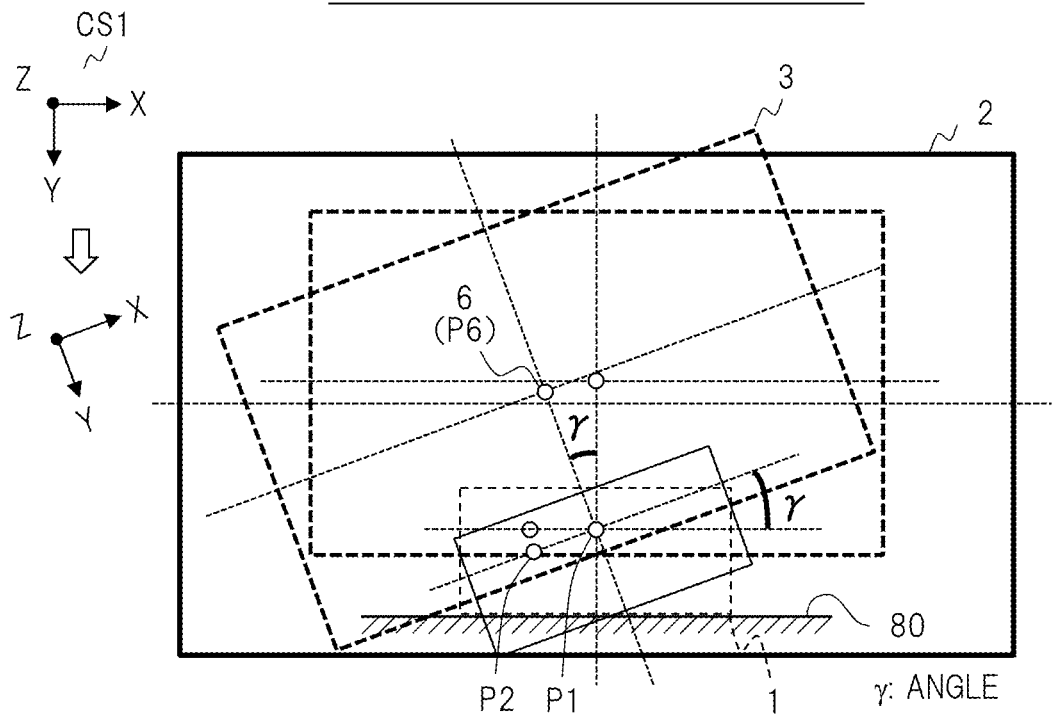
CASE OF INCLINATION AROUND Z AXIS
γ: ANGLE
S5C
CALCULATION OF POST-TRANSFORMATION GRID POINT COORDINATES VG2
CALCULATION OF QUADRANGULAR AREA 148 INCLUDED IN PROJECTABLE AREA 145
141C: POST-TRANSFORMATION VIRTUAL CAMERA IMAGE
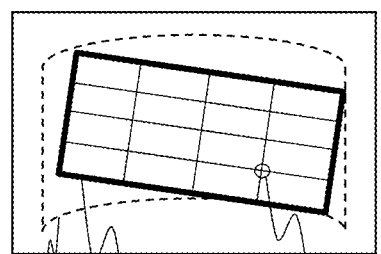
148 QUADRANGULAR AREA (FIGURE HAVING IN-PLANE INCLINATION)
(S5C)

FIG. 20
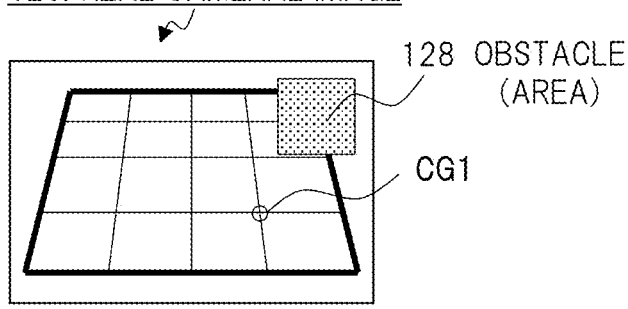
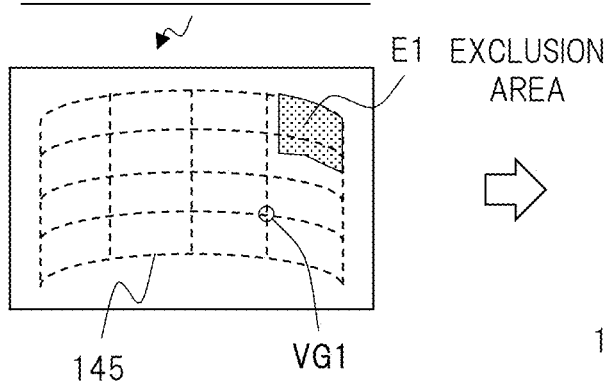 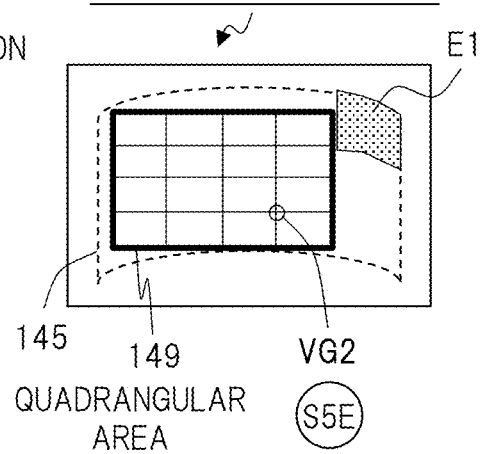

FIG. 21
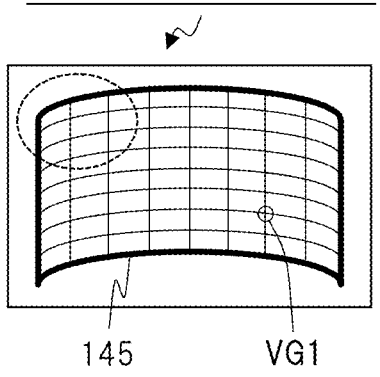
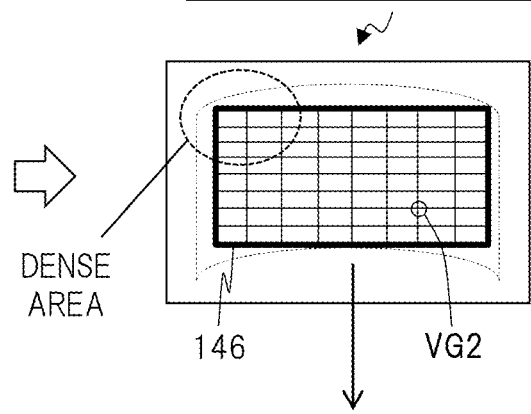
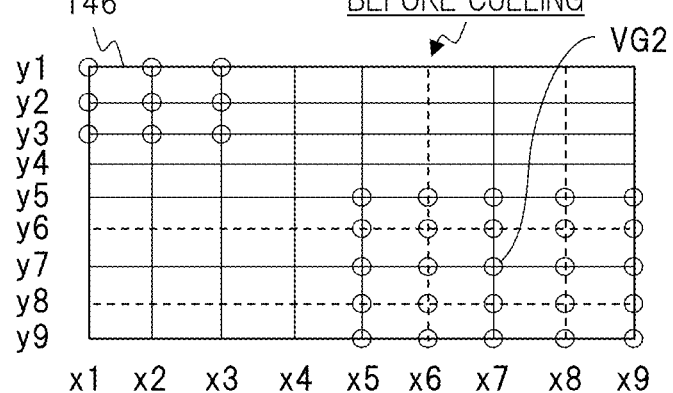
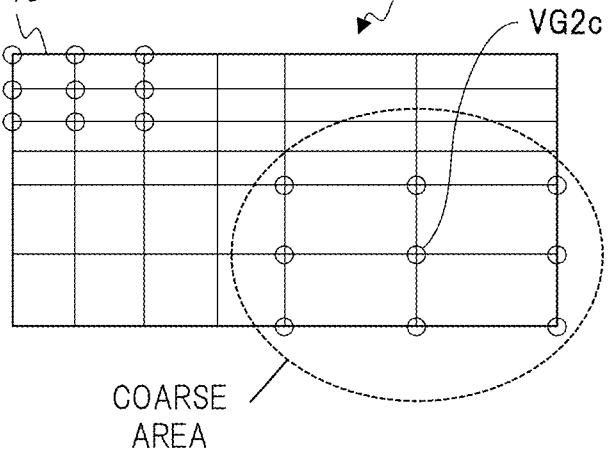

IMAGE DISPLAY APPARATUS AND METHOD

TECHNICAL FIELD

The present invention relates to a technology for an image display apparatus such as a projector and particularly relates to a technology effectively applied to the case in which an image projection surface such as a screen has a shape of irregularities or a free-form surface.

BACKGROUND ART

In the projection-type image display apparatus, when an image projection surface such as a screen is not flat, for example, when it has a shape of irregularities or a free-form surface, geometric distortion occurs in the projected image seen by the user who is a viewer. Conventionally, in an environment such as a school or a workplace, an image is projected by a projector onto a blackboard or a whiteboard having a concave curved surface or the like used as a screen in some cases. If the projected image has geometric distortion, the user may find the image difficult to see.

As an example of the prior art related to an image display apparatus that projects an image onto a curved surface, Japanese Unexamined Patent Application Publication No. 2001-83949 (Patent Document 1) can be mentioned. Patent Document 1 describes the image projection apparatus capable of achieving labor saving in installation adjustment work. In the technology described in Patent Document 1, in a situation in which an image projected by a projector arranged diagonally with respect to a screen having a free-form surface is observed at a certain viewpoint position, a test image is projected to generate correction data for giving a reverse distortion in advance, and an image to be projected is corrected by using this correction data and is then projected by the projector, so that a correct image without distortion when seen from the viewpoint position can be obtained.

RELATED ART DOCUMENTS

Patent Documents

Patent Document 1: Japanese Unexamined Patent Application Publication No. 2001-83949

SUMMARY OF THE INVENTION

Problems to be Solved by the Invention

In the conventional projection-type image display apparatus, the mechanism capable of appropriately correcting the geometric distortion generated in the projected image due to the shape of irregularities or the free-form surface of the image projection surface of the screen has not been sufficiently studied, and there is room for improvement.

In the image projection apparatus in an example of the prior art such as Patent Document 1, the test image projected on the screen is captured by a camera installed at the viewpoint position, and the image is corrected based on the correspondence relationship between the point coordinates in the projected image and the point coordinates in the camera image. However, in the image projection apparatus like this, adjustment work such as installing a camera separate from the projector main body at the viewpoint position of the user and capturing the image is necessary in accordance with the environment. Therefore, there is a problem in terms of usability, such as a lot of labor for the user.

An object of the present invention is to provide a technology capable of properly correcting geometric distortion generated due to the shape of a curved surface of an image projection surface or the like and obtaining a suitable image that is easily viewable for a user, in relation to a projection-type image display apparatus. Other problems and effects of the present invention will be described in embodiments for carrying out the invention.

Means for Solving the Problems

A typical embodiment of the present invention has a configuration shown below. An image display apparatus according to an embodiment is an image display apparatus configured to project an image onto a screen, and the image display apparatus includes a projection lens arranged at a first position and a camera arranged at a second position. When the screen has a curved surface, a camera image obtained by capturing a first image projected on the screen by the camera is acquired, and a geometric transformation for correcting a geometric distortion caused by the curved surface seen from a first virtual viewpoint position is performed for an image to be displayed based on information of the camera image, the first position, and the second position, and a post-transformation image is projected onto the screen.

Effects of the Invention

According to a typical embodiment of the present invention, it is possible to properly correct geometric distortion generated due to the shape of irregularities or a curved shape of an image projection surface or the like and obtain a suitable image that is easily viewable for a user, in relation to a projection-type image display apparatus.

BRIEF DESCRIPTIONS OF THE DRAWINGS

FIG. 1 is a perspective view showing a schematic configuration of a display system including an image display apparatus according to the first embodiment of the present invention;

FIGS. 2(A) and 2(B) are diagrams showing a top-view configuration and a side-view configuration, respectively, of the display system including the image display apparatus according to the first embodiment;

FIG. 4 is a diagram showing examples of a pattern image in the first embodiment;

FIG. 11 is a diagram showing a screen distance at the time of calibration in the first embodiment;

Figure 13:
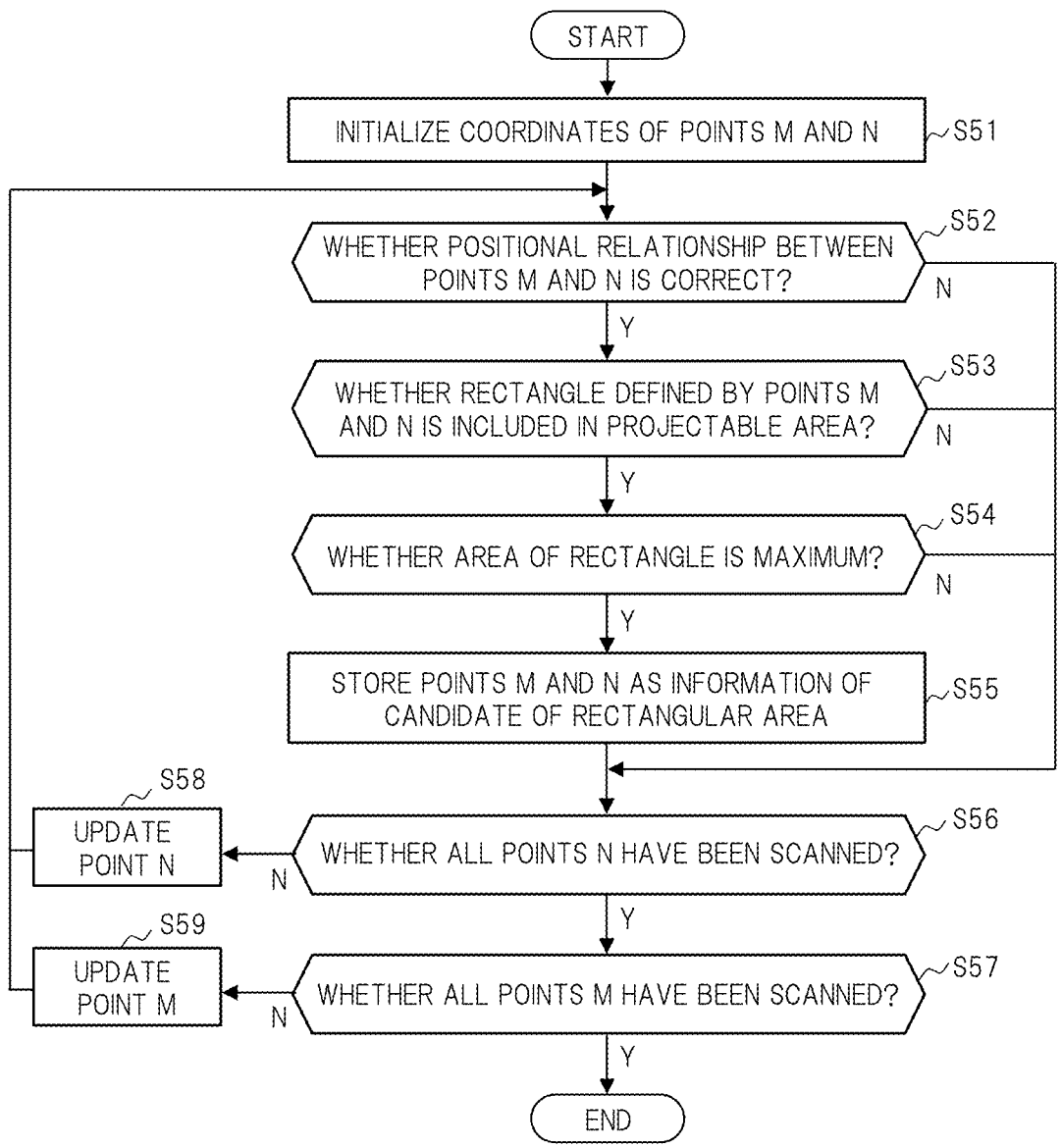
Figure 14:
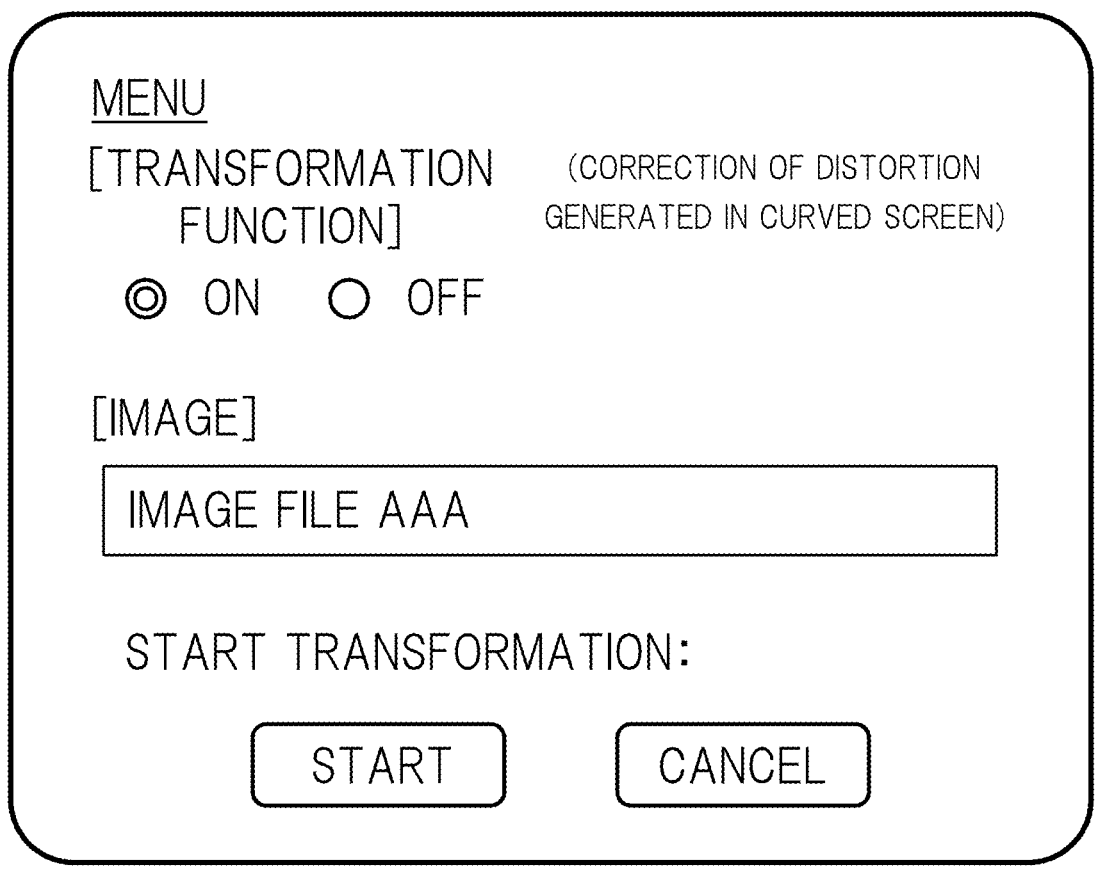
Figure 15:
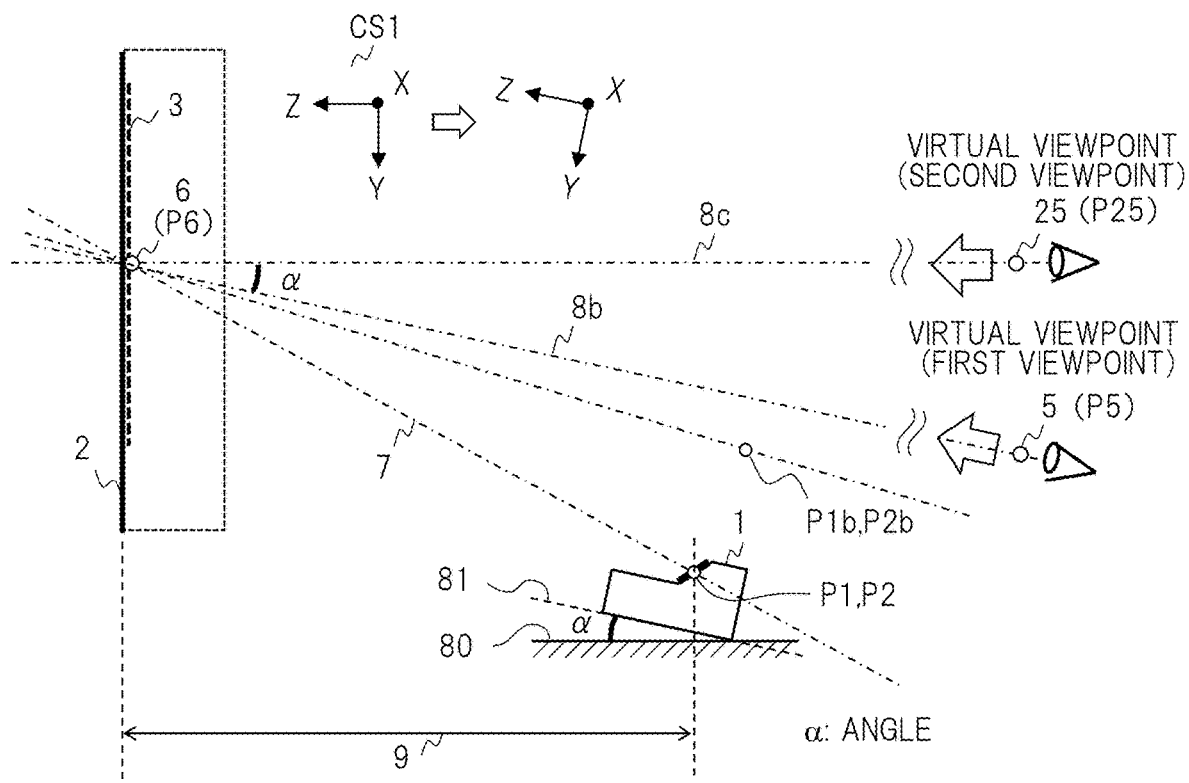
Figure 16:
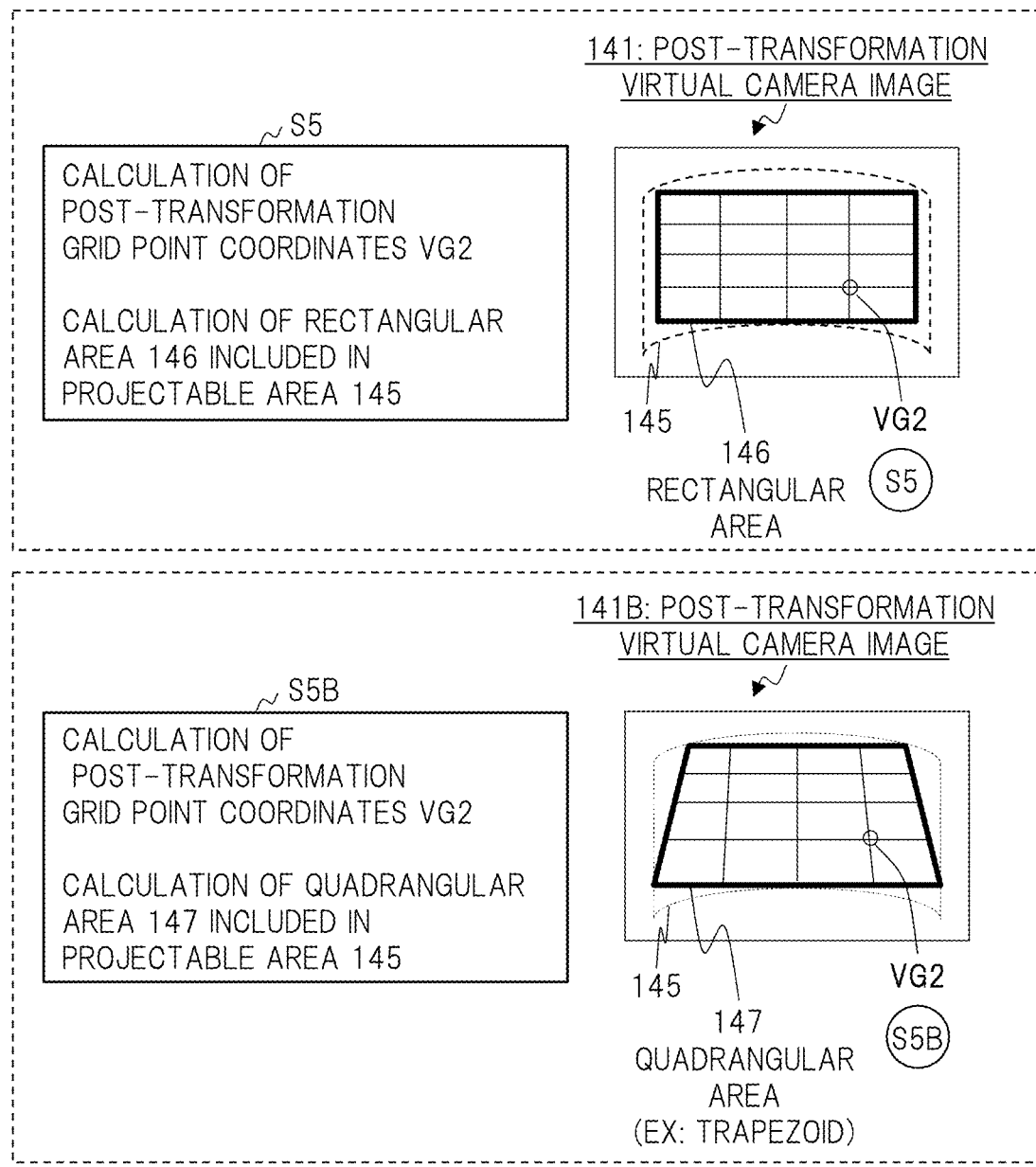
Figure 18:
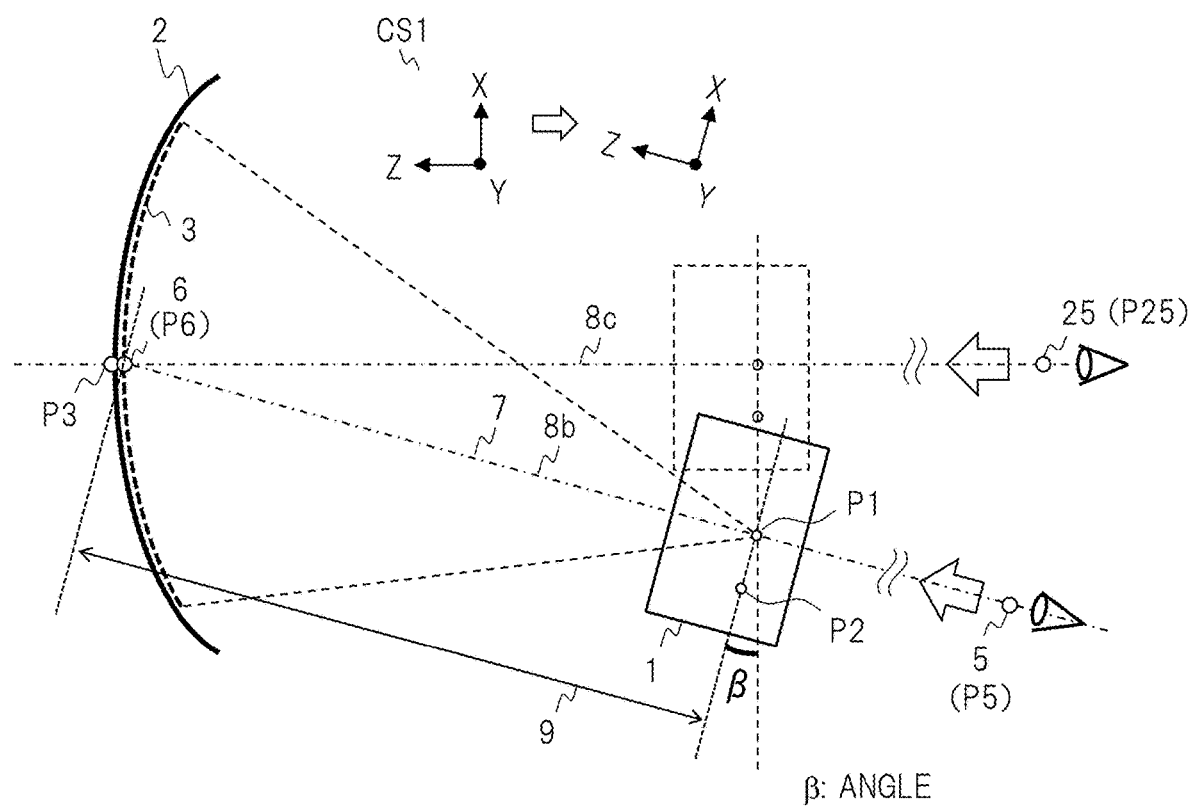

FIGS. 12(A) and 12(B) are diagrams showing a real camera image and a virtual camera image, respectively, at the time of calibration in the first embodiment;

FIG. 13 is a diagram showing a flow of a process example of step S5 in the first embodiment;

FIG. 14 is a diagram showing a display example of a GUI menu in the first embodiment;

FIG. 15 is a diagram showing the case where there is an inclination around an X axis in an image display apparatus according to the second embodiment of the present invention;

FIG. 16 is a diagram showing a post-transformation virtual camera image in the second embodiment;

FIG. 17 is a diagram showing a display example of a setting menu of the GUI in the second embodiment;

FIG. 18 is a diagram showing the case where there is an inclination around a Y axis in the second embodiment;

FIG. 19 is a diagram showing the case where there is an inclination around a Z axis in the second embodiment;

FIG. 20 is a diagram showing the case where there is an obstacle in the screen in an image display apparatus according to the third embodiment of this invention; and FIG. 21 is a diagram showing the culling of the division number of a grid of a virtual camera image in an image display apparatus according to the fourth embodiment of the present invention.

DETAILED DESCRIPTION OF PREFERRED EMBODIMENT

Hereinafter, embodiments of the present invention will be described in detail with reference to drawings. Note that the same components are denoted by the same reference sings throughout the drawings in principle and the repetitive description thereof will be omitted.

First Embodiment

An image display apparatus according to the first embodiment of the present invention will be described with reference to FIG. 1 to FIG. 14.

A projector which is the image display apparatus according to the first embodiment has a transformation function capable of automatically correcting geometric distortion generated in a projected image by using, for example, a camera built in a projector main body, when a screen has a curved surface. This transformation is a geometric transformation of image data, and is a transformation for correcting geometric distortion caused by a curved surface when seen from a virtual viewpoint position. By this means, a suitable projected image in which geometric distortion is eliminated or reduced when seen from the virtual viewpoint position can be obtained. The user does not need to perform adjustment work such as installing a separate camera and capturing an image by the camera.

The image display apparatus according to the first embodiment includes a projection lens arranged at a first position and a camera arranged at a second position different from the first position. For example, the positional relationship including the distance between the first position of the projection lens and the second position of the camera is fixed, and the image display apparatus already knows the information of the positional relationship. The image display apparatus projects a first image and obtains a camera image obtained by capturing the first image by a camera. The first image is, for example, a pattern image corresponding to the configuration of division of the grid. The image display apparatus calculates each point of the grid of the projected image on the screen based on the camera image and the information of the positional relationship, and calculates the distance from the first position to each point of the grid. The grid and distance represent the shape of the curved surface of the screen. The image display apparatus calculates a transformation matrix for correcting geometric distortion based on the information of the grid and the distance, performs geometric transformation to the image to be displayed by using the transformation matrix, and projects a post-transformation image onto the screen.

The virtual viewpoint position is a virtually-assumed standard user viewpoint position different from the first position and the second position. The image display apparatus according to the first embodiment calculates a virtual camera image which is a projected image when seen from the virtual viewpoint position, and calculates the transformation matrix by using the virtual camera image.

(1) Display System

FIG. 1 schematically shows the configuration of the entire display system including a projector 1 which is the image display apparatus according to the first embodiment in a perspective view. FIG. 1 shows an example of installation and usage of the projector 1 and a screen 2. In this example, the screen 2 has a concave free-form surface. In FIG. 1, an absolute coordinate system CS0 and a projector coordinate system CS1 are shown as explanatory coordinate systems. In the example of FIG. 1, the absolute coordinate system CS0 and the projector coordinate system CS1 are the same. In this absolute coordinate system CS0, the two orthogonal directions forming the horizontal plane are the X direction and the Z direction, the vertical direction is the Y direction, and the Z direction is defined as the direction in which the projector 1 and the screen 2 face each other. The projector coordinate system CS1 is the coordinate system based on the projector 1, in other words, the coordinate system seen from a projection lens 22, and has a position P1 of the projection lens 22 as the origin and each axis of (X, Y, Z) and corresponding directions. The X axis corresponds to the lateral or left-right direction of the main body of the projector 1, and corresponds to the horizontal direction in the projected image 3. The Y axis corresponds to the longitudinal or top-bottom direction of the main body of the projector 1, and corresponds to the vertical direction in the projected image 3. The Z axis corresponds to the front-back direction of the main body of the projector 1, and corresponds to the direction perpendicular to the surface of the projected image 3. In the state of FIG. 1, since the projector 1 is installed in parallel to the horizontal plane, the X axis and the Z axis of the projector coordinate system CS1 coincide with the direction of the horizontal plane of the absolute coordinate system CS0, and the Y axis coincides with the vertical direction.

In FIG. 1, the display system includes the projector 1, an image source device 4, and the screen 2. A user (not shown) sees the projected image 3 on the screen 2 from any viewpoint position (not shown) in the space. In FIG. 1, the projector 1 is installed in parallel to the horizontal plane at a position straightly facing the screen 2 in the Z direction. The projector 1 is installed at a position slightly diagonally below the center of the screen 2. Correspondingly, the direction of image projection from the projection lens 22 of the projector 1 and the direction of a camera 10 are slightly diagonally upward.

The screen 2 has a shape of a concave free-form surface with respect to the projector 1. The screen 2 is, for example, a concave whiteboard used in schools and the like, but the screen 2 is not limited to this, and objects of various shapes can be applied. As the screen 2, an object having a shape of a free-form surface including a concave curved surface and a convex curved surface can be applied, and a flat wall, a wall having irregularities in the surface, and a wave-shaped object such as a curtain can also be applied. In FIG. 1, a rectangular parallelepiped including the screen 2 is indicated by broken lines for easy understanding. The center point of the screen 2 is indicated by a position P3. An area of the projected image 3 (indicated by broken lines) is included in an area of the curved surface on the front side of the screen 2. The point of the pixel at the center of the projected image 3 is defined as a projection center 6, and is indicated by a position P6. The projector 1 can change the area of the projected image 3 (corresponding position P6) within the area of the screen 2.

The image source device 4 is the device having image data to be projected, for example, a DVD player, a PC, or the like. The output of the image source device 4 is connected to an image input terminal of the projector 1 via wire or wireless. The image from the image source device 4 is input to the image input terminal of the projector 1. The configuration in which the image source device 4 is built in the projector 1 is also possible.

The camera 10 is built in a housing of the projector 1. The camera 10 is installed at a position on the surface of the housing of the projector 1, from which it can capture the projected image 3 from the projection lens 22. In FIG. 1, the projector 1 has a substantially rectangular parallelepiped housing, and includes the projection lens 22 and the camera 10 at predetermined positions in the housing. The position of the projection lens 22 is indicated by the position P1. The position of the camera 10 is indicated by a position P2. In the example of FIG. 1, the position P1 is located near the center of the upper surface of the housing, and the position P2 is located at the position apart from the position P1 to the left by a predetermined distance in the X direction.

A straight line connecting the position P1 of the projection lens 22 to the position P6 of the projection center 6 of the projected image 3 is indicated as a projector optical axis 7 (indicated by a one-dot chain line), which is the optical axis of the projection of the projector 1. The direction of the optical axis of the camera 10 is substantially the same as the direction of the projector optical axis 7.

In the example of FIG. 1 of the first embodiment, the projector 1 of a short-projection type is used. The short-projection type has a short projection distance, in other words, the distance between the projector 1 and the screen 2 in the Z direction is short. In the case of the short-projection type, there is an advantage that calculation of a screen distance 9 using the camera 10 is easy. The projector 1 is not limited to the short-projection type and any type can be applied, and any installation state is possible without being limited to that shown in FIG. 1.

In general, when a user uses a projector, the installation position of the projector (the position of the corresponding projection lens) and the viewpoint position of the user are usually different. Therefore, when the screen 2 is not flat as shown in FIG. 1, or in another case, when the projector does not straightly face the screen, the user sees the projected image 3 having geometric distortion even if the user sees the projected image 3 from the projector 1 from, for example, a virtual viewpoint 5. Thus, the projector 1 is provided with a transformation function for correcting the geometric distortion when seen from the virtual viewpoint 5.

(2) Projector

Figure 2A:
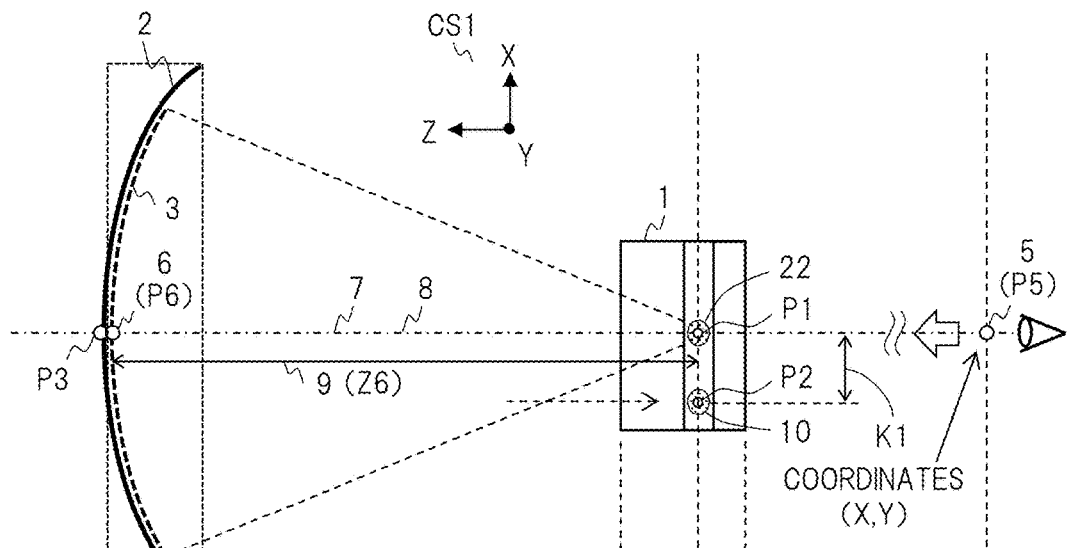
Figure 2B:
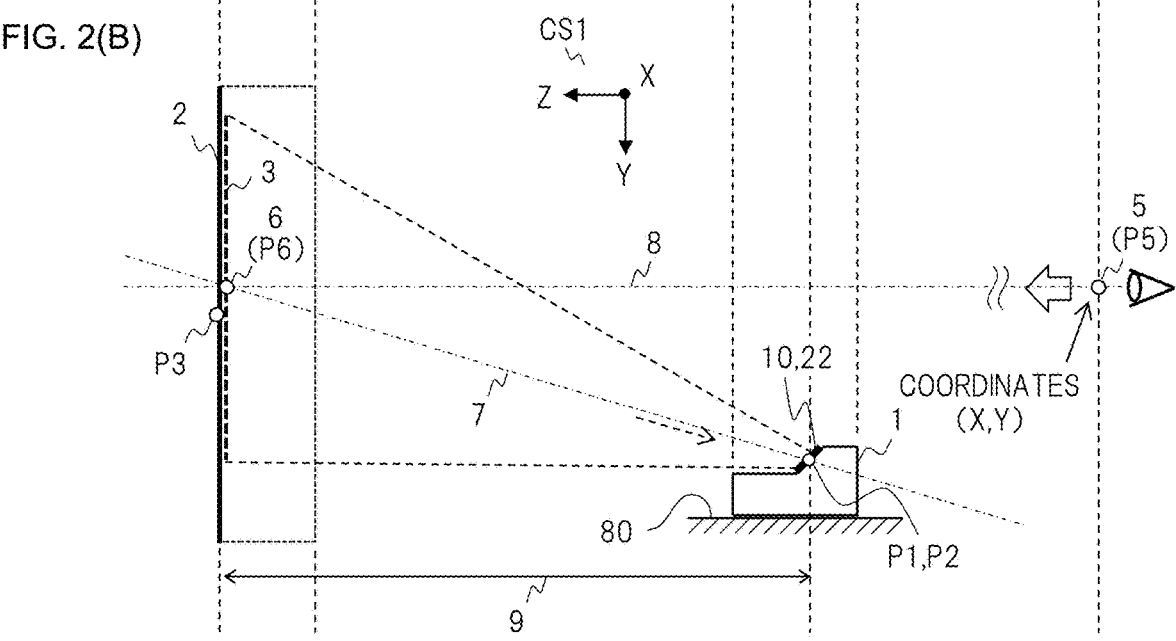

FIGS. 2(A) and 2(B) show an example of the installation state of the projector 1, in which FIG. 2(A) shows a top view of the state of FIG. 1, that is, an outline of the configuration when the X-Z plane is seen in a plan view in the Y direction and FIG. 2B shows a side view of the state of FIG. 1, that is, an outline of the configuration when the Y-Z plane is seen in a plan view in the X direction. The projector 1 is installed on a horizontal plane 80. The horizontal plane 80 is, for example, a table on which the projector 1 is installed.

For example, the orientation of the camera 10 is substantially the same as the orientation of the projection lens 22 and is the Z direction in FIG. 2(A). It is not always necessary that the orientation of the projection lens 22 and the orientation of the camera 10 coincide with each other. The orientation of the camera 10 may be any orientation as long as the capturing range of the camera 10 includes the area of the screen 2.

The position P1 of the projection lens 22 and the position P2 of the camera 10 have a predetermined distance K1 in the X direction, and their positional relationship is fixed. The projector 1 knows the positional relationship including these positions P1 and P2 and the distance K1. The projector 1 can calculate the screen distance 9 in the Z direction based on this positional relationship. As the distance calculation method, a known method using a stereo camera or the like can be similarly applied.

The virtual viewpoint 5 will be described. In FIG. 1 and FIGS. 2(A) and 2(B), the absolute coordinate system CS0 and the projector coordinate system CS1 are the same for the sake of simplicity. Now consider a straight line 8 that passes through the position P6 of the projection center 6 of the projected image 3 and is a horizontal line parallel to the Z axis. In other words, this straight line 8 is a horizontal line passing through the center of the image. The projector 1 sets the virtual viewpoint 5 and the corresponding position P5 on the extension of the straight line 8 in the Z direction. The virtual viewpoint 5 (position P5) is defined as a point sufficiently separated behind the projector 1 on the straight line 8. The position P5 of the virtual viewpoint 5 has the coordinates (X, Y) of the X axis and the Y axis. The virtual viewpoint 5 is a virtually-assumed standard user viewpoint position in accordance with the installation state of the projector 1. When considering the case where the virtual viewpoint 5 is at infinity from the screen 2, the projected image 3 seen from the virtual viewpoint 5 is an image obtained by orthographic projection of the projected image 3 onto the X-Y plane regardless of the screen distance 9. Since the image seen from the virtual viewpoint 5 is the image captured when the camera is virtually placed at the virtual viewpoint 5, it is described as a virtual camera image.

The transformation function of the projector 1 is the function of performing geometric transformation such that a suitable image can be obtained when the projected image 3 is seen from the virtual viewpoint 5. The actual viewpoint position of the user is not always the same as the position P5 of the virtual viewpoint 5 and there is a deviation, but a suitable projected image 3 in which the geometric distortion is sufficiently reduced can be obtained if the actual viewpoint position of the user falls within a predetermined range centered on the position P5 of the virtual viewpoint 5.

The screen distance 9 is the distance in the Z direction from the position P1 of the projection lens 22 of the projector 1 to the position of each point of the projected image 3 on the screen 2. The shape of the curved surface of the screen 2 is reflected on the screen distance 9. The screen distance 9 is different from the projector optical axis 7.

(3) Camera

The projector 1, which is the image display apparatus according to the first embodiment, has the configuration in which the camera 10 is built in the main body. In the example of the first embodiment, as shown in FIGS. 2(A) and 2(B), the position P2 of the camera 10 with respect to the position P1 of the projection lens 22 of the main body of the projector 1 is set at the position separated from the position P1 of the projection lens 22 by a predetermined distance K1 in the X direction. This positional relationship is defined in advance at the time of product shipment, and information of this positional relationship is preliminary set in the projector 1.

The configuration of the camera 10 is not limited to this, and various configurations are possible. Any position can be applied as the position P2 of the camera 10 as long as it is located within a range in which the projected image 3 on the screen 2 can be captured and the screen distance 9 in the Z direction can be calculated.

The following is possible as a modification of the camera 10. In the modification, the camera 10 can be appropriately attached and installed by the user as an accessory of the optional function at a position within a predetermined range on the outer surface of the main body of the projector 1. The camera 10 is attached and held at a position within a predetermined range of the main body through a predetermined hardware mechanism. For example, when the screen 2 does not have a curved surface, the user does not attach the camera 10 to the projector 1 and does not use the transformation function. When the screen 2 has a curved surface, the user attaches the camera 10 to the projector 1 and uses the transformation function. Also, the position of the camera 10 is not limited to the position in the plane of the main body of the projector 1, and it may be located at a spatial position separated from the surface of the main body by a predetermined distance via a predetermined hardware mechanism (for example, a camera mounting device or the like). Further, the position P2 of the camera 10 with respect to the main body of the projector 1 (position P1 of the projection lens 22) may be variably adjusted by the user. In that case, the position, distance, and the like of the camera 10 can be set by user setting or automatic determination of the main body.

(4) Projector Functional Block

Figure 3:
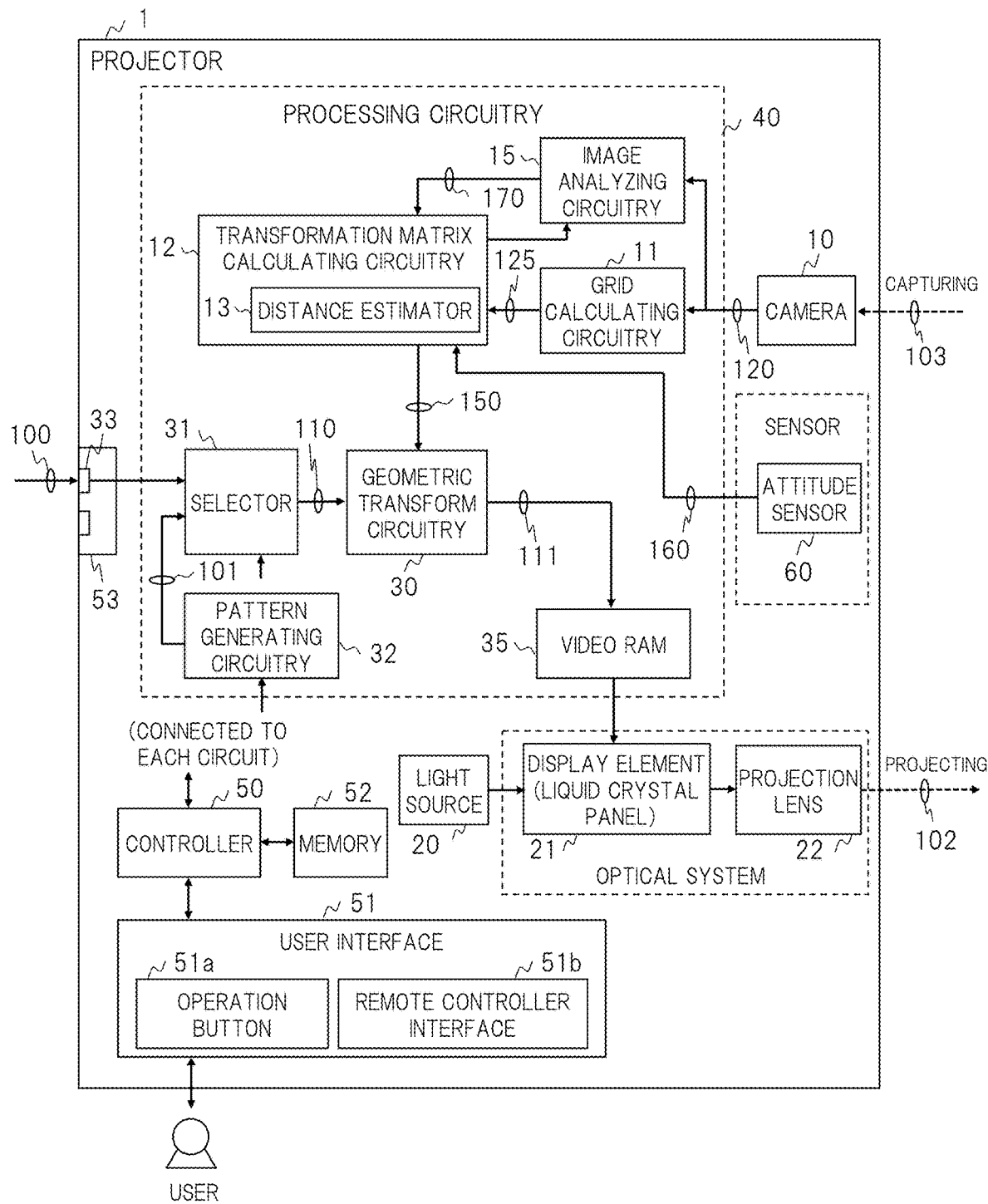
FIG. 3 is a diagram showing a functional block configuration of the image display apparatus according to the first embodiment.

FIG. 3 shows an internal functional block configuration of the projector 1. The projector 1 includes a controller 50, a memory 52, a user interface 51, the camera 10, a light source 20, a display element 21, the projection lens 22, an input/output/communication interface 53, a processing circuitry 40, an attitude sensor 60, and the like. These elements are connected via a system bus or the like (not shown).

The controller 50 corresponds to a processor composed of a CPU or the like, and controls the entire projector 1. The memory 52 stores various data and information read and written by the controller 50, and is composed of a non-volatile storage device or the like. The memory 52 may be provided in the controller 50. The controller 50 is connected to each circuit or the like in the projector 1, generates a timing signal or the like based on a control clock, and performs the transmission of the signal to each circuit and the reception of the signal from each circuit.

The user interface 51 includes an operation button 51a and a remote controller interface 51b, and is a part that implements an interface for user operation. The operation button 51a is a hardware button. The remote controller interface 51b is a part that receives electromagnetic waves from a remote controller (not shown).

The input/output/communication interface 53 is a part that implements interfaces for input, output, communication, and the like, and includes an image input terminal 33 and the like. An image 100 (corresponding image data) from the image source device 4 of FIG. 1 is input to the image input terminal 33. The data of the image 100 input to the image input terminal 33 is input to a selector 31.

The selector 31 has a function of selecting an image to be projected by the projector 1. Also, the selector 31 has a function of superimposing a GUI (Graphical User Interface) image on the selected image. The image output from the selector 31 is defined as a pre-transformation image 110 (corresponding image data or image signal). The pre-transformation image 110 becomes a post-transformation image 111 (corresponding image data or image signal) by performing geometric transformation by a geometric transform circuitry 30.

The light source 20 produces light for image projection. The display element 21 is, for example, a liquid crystal panel, and generates an image based on the light from the light source 20 and the image data from a video RAM 35. The display element 21 is, for example, a transmissive liquid crystal panel, but is not limited to this, and may be a reflective liquid crystal panel, an element composed of a movable mirror, or the like. The display element 21 may be, for example, three liquid crystal panels corresponding to three colors of R, G, and B. In the display element 21, the transmittance of each pixel is controlled in accordance with each pixel value of the post-transformation image 111. Based on the light from the light source 20, the transmitted light controlled by the display element 21 is supplied to the projection lens 22.

The projection lens 22 projects the image from the display element 21 toward the screen 2. The display element 21 and the projection lens 22 are a part of an optical system such as a projection optical system. The optical system may include other elements such as an optical filter and a mirror (not shown). A projection light 102 which is the outgoing light from the projection lens 22 is projected onto the screen 2. As the light source 20, the display element 21, the projection lens 22, and the like, for example, those conventionally used in general projectors can be applied.

The camera 10 receives a capturing light 103 from the screen 2 to capture the image by an imaging element such as a CCD, and outputs an image 120 (referred to also as a camera image or a real camera image). The camera image 120 is input to the processing circuitry 40 and stored in a memory (not shown).

As the processing circuitry 40, an example of the circuit that implements a transformation function for correcting geometric distortion of a projected image is shown. The processing circuitry 40 includes the selector 31, a pattern generating circuitry 32, the geometric transform circuitry 30, the video RAM 35, a grid calculating circuitry 11, a transformation matrix calculating circuitry 12, an image analyzing circuitry 15, and the like. The transformation matrix calculating circuitry 12 includes a distance estimator 13. The processing circuitry 40 may be mounted on an IC chip or the like, or respective circuit components may be mounted on different IC chips or the like. For example, the grid calculating circuitry 11 and the transformation matrix calculating circuitry 12 may be mounted on one IC chip.

The selector 31 receives the input of the image data from the image input terminal 33 and a pattern image 101 from the pattern generating circuitry 32, and outputs the image selected from those two inputs to the geometric transform circuitry 30 as the pre-transformation image 110. Also, the selector 31 also has a function as a superimposing unit of GUI or OSD (On-Screen Display), and superimposes an image such as GUI on the input image. The controller 50 controls the selection of the selector 31 and the like. The selector 31 may be implemented by a hardware circuit or may be implemented by the software processing. In the case of the latter implementation, the projector 1 may perform the display related to the selection of the input by the GUI and execute the selection in accordance with the operation of the user.

The pattern generating circuitry 32 generates the pattern image 101 based on the setting information. The pattern image 101 is a predetermined image used for calculating the grid points of the projected image 3, the screen distance 9, and the like. The generated pattern image 101 is projected onto the screen 2 via the selector 31 and the like. The projector 1 continuously projects the pattern image 101 onto the screen 2 at a certain time before the image to be displayed specified by the user is projected, and captures it by the camera 10. Setting information related to the pattern image 101 is set in advance in the pattern generating circuitry 32. This setting information includes the division number and can be changed by the user setting. The division number is a set value related to how finely the grid is divided into areas and how many areas it is composed of.

The grid calculating circuitry 11 calculates each point of the grid (grid point coordinates) in the projected image 3 based on the image 120 from the camera 10 and outputs it as grid data 125.

The transformation matrix calculating circuitry 12 calculates the screen distance 9 of each point by the distance estimator 13 by the use of the grid point coordinates of the grid data 125 from the grid calculating circuitry 11. The distance estimator 13 performs the calculation to estimate the screen distance 9 for each grid point. The transformation matrix calculating circuitry 12 calculates a geometric transformation matrix 150 by using the information of the grid and the screen distance 9. The geometric transformation matrix 150 is a matrix for the geometric transformation of the pre-transformation image 110 into the post-transformation image 111. The transformation matrix calculating 12 circuitry outputs the geometric transformation matrix 150 to the geometric transform circuitry 30. The geometric transformation matrix 150 is set in the geometric transform circuitry 30.

The geometric transform circuitry 30 performs the geometric transformation to the input pre-transformation image 110 by the use of the geometric transformation matrix 150, and outputs the resulting post-transformation image 111. The post-transformation image 111 is temporarily stored in the video RAM 35 and is then supplied to the display element 21. The configuration without the video RAM 35 is also possible. In other words, the geometric transform circuitry 30 can be expressed as an image correcting unit, an image transforming unit, an image processor, or the like. It is also possible to perform the grid point calculation and the transformation matrix calculation described above by the controller 50, the geometric transform circuitry 30, or the like.

The transformation in the geometric transform circuitry 30 can be switched between execution (ON state) and non-execution (OFF state). The controller 50 controls ON/OFF of the transformation in the geometric transform circuitry 30. The ON state of the transformation corresponds to the execution of the correction of the image, and the OFF state of the transformation corresponds to the non-execution of the correction of the image, in other words, the through of the image. As a usage, it is possible to switch the transformation to the ON state in the case of the screen 2 having a curved surface and switch the transformation to the OFF state in the case of the flat screen. For example, the ON/OFF mechanism for the transformation can be implemented as follows. The geometric transform circuitry 30 may be provided with a switch circuit or the like for the ON/OFF of the transformation. When the transformation is OFF, the controller 50 prevents the pre-transformation image 110 from passing through the geometric transform circuitry 30 by using the switch circuit. Alternatively, it may be implemented by software program processing. In this case, when the transformation is OFF, the controller 50 or the geometric transform circuitry 30 sets the geometric transformation matrix so as to be in the state of the identity matrix. This identity matrix corresponds to a matrix which does not perform the geometric transformation, in other words, a matrix which does not change before and after the transformation.

The configuration example of FIG. 3 shows a case where each main component is implemented by hardware, but some elements may be implemented by software program processing. The controller 50 or the processing circuitry 40 executes the processing in accordance with the program. As a result, the function of each element is realized. Further, some of the components may be mounted in an external device of the projector 1.

(5) Transformation Function

The outline of the transformation function is as follows. Before projecting the image to be displayed, the projector 1 first projects the pattern image 101 onto the screen 2 in order to grasp the shape of the curved surface of the screen 2. The projector 1 captures the state of the pattern image 101 projected on the screen 2 by the camera 2. The projector 1 calculates each point of the grid from the captured camera image. The projector 1 calculates the screen distance 9 from each point of the grid. The projector 1 calculates the geometric transformation matrix 150 by the use of the information of the grid and the distance, and sets it in the geometric transform circuitry 30. The projector 1 performs the geometric transformation of the image to be displayed, by the use of the geometric transformation matrix 150, and projects the post-transformation image 111 onto the screen 2. As a result, the projected image 3 becomes a suitable image without geometric distortion when seen from the virtual viewpoint 5.

For example, the geometric transformation in the geometric transform circuitry 30 is as follows. In general, the shape change when a two-dimensional image is projected on another plane can by projective be calculated transformation. The transformation in this case is the projective transformation from two-dimensional coordinates to two-dimensional coordinates. This transformation can be defined by matrix calculation using a 3×3 transformation matrix shown in Equation 1 below.

$$\begin{bmatrix} xa \\ ya \\ 1 \end{bmatrix} = \begin{bmatrix} a00 & a01 & a02 \\ a10 & a11 & a12 \\ a20 & a21 & 1 \end{bmatrix} \begin{bmatrix} xb \\ yb \\ 1 \end{bmatrix} \quad \text{(Equation 1)}$$

In Equation 1, if the 3×3 transformation matrix is the matrix M, the vector before transformation is the vector V1, and the vector after transformation is the vector V2, it is represented by V2=M×V1. In Equation 1, (xb, yb) of the vector V1 indicates the coordinates of the point before transformation. Also, (xa, ya) of the vector V2 indicates the coordinates of the point after transformation. The coefficients a00, a01, a02, a10, a11, a12, a20, and a21 in the elements of the matrix M are the coefficients of the transformation matrix (generally referred to as the coefficients a**).

Equation 1 indicates the geometric transformation in the homogeneous coordinate system. Here, one of the elements of the transformation matrix (coefficient in the third row and third column) is fixed to "1". Therefore, if the remaining eight coefficients a** can be calculated, the transformation matrix of the projective transformation is uniquely determined. If four sets of coordinates before and after the transformation are given, simultaneous equations of eight variables consisting of eight equations are established. Note that special cases where the four points are on the same straight line are excluded. Therefore, the transformation matrix of the projective transformation can be calculated by solving these simultaneous equations. Namely, if it is known how the shape of the quadrangle on the plane before transformation changes on the plane after transformation, the transformation matrix can be calculated by using the vertex coordinates of the quadrangle before and after the transformation. By using this transformation matrix, the coordinates of the points on the plane after the transformation can be calculated for all the points on the plane before the transformation.

In the first embodiment, based on the above principle, the post-transformation image 111 is generated from the pre-transformation image 110 by geometric transformation. Since the screen 2 has a curved surface, the transformation from the pre-transformation image 110 to the post-transformation image 111 cannot be represented by a single transformation matrix. Therefore, the projector 1 divides each image into a plurality of areas (may be described as blocks) smaller than the original image frame like a grid. Then, the projector 1 performs the projective transformation (corresponding geometric transformation) for each divided area based on the above principle. Accordingly, when each area is sufficiently small, each area can be regarded as an almost flat surface before and after the transformation. Therefore, in the unit of each area, the image transformation can be performed by the single transformation matrix.

(6) Pattern Image

FIG. 4 shows an example of the pattern image 101. As the pattern image 101, various patterns such as (1) gray code pattern, (2) checker pattern, and (3) dot pattern shown in the drawing can be used. Any pattern image 101 can be used as long as it enables the calculation of the grid point coordinates, and the details are not limited. The gray code pattern is composed of a plurality of pattern images g1 to g6. For example, the pattern image g1 is a pattern of a white area, the pattern image g2 is a pattern of a black area (or a gray area), and the pattern image g3 is a pattern in which the left half is a white area and the right half is a black area. The plurality of pattern images are continuously projected while being switching in time series. The projector 1 can form a grid by detecting the boundary lines between the white areas and the black areas of the pattern image. The checker pattern is the pattern in which a plurality of white areas and a plurality of black areas are alternately arranged. The dot pattern is the pattern in which a plurality of colored dots are arranged in a matrix. For example, the dot pattern is the pattern in which dots are arranged so as to correspond to the positions of grid points of the grid in the pre-transformation image 110. Note that the broken lines in each pattern are the explanatory lines and are not displayed in practice.

(7) Screen Distance

Figure 5:
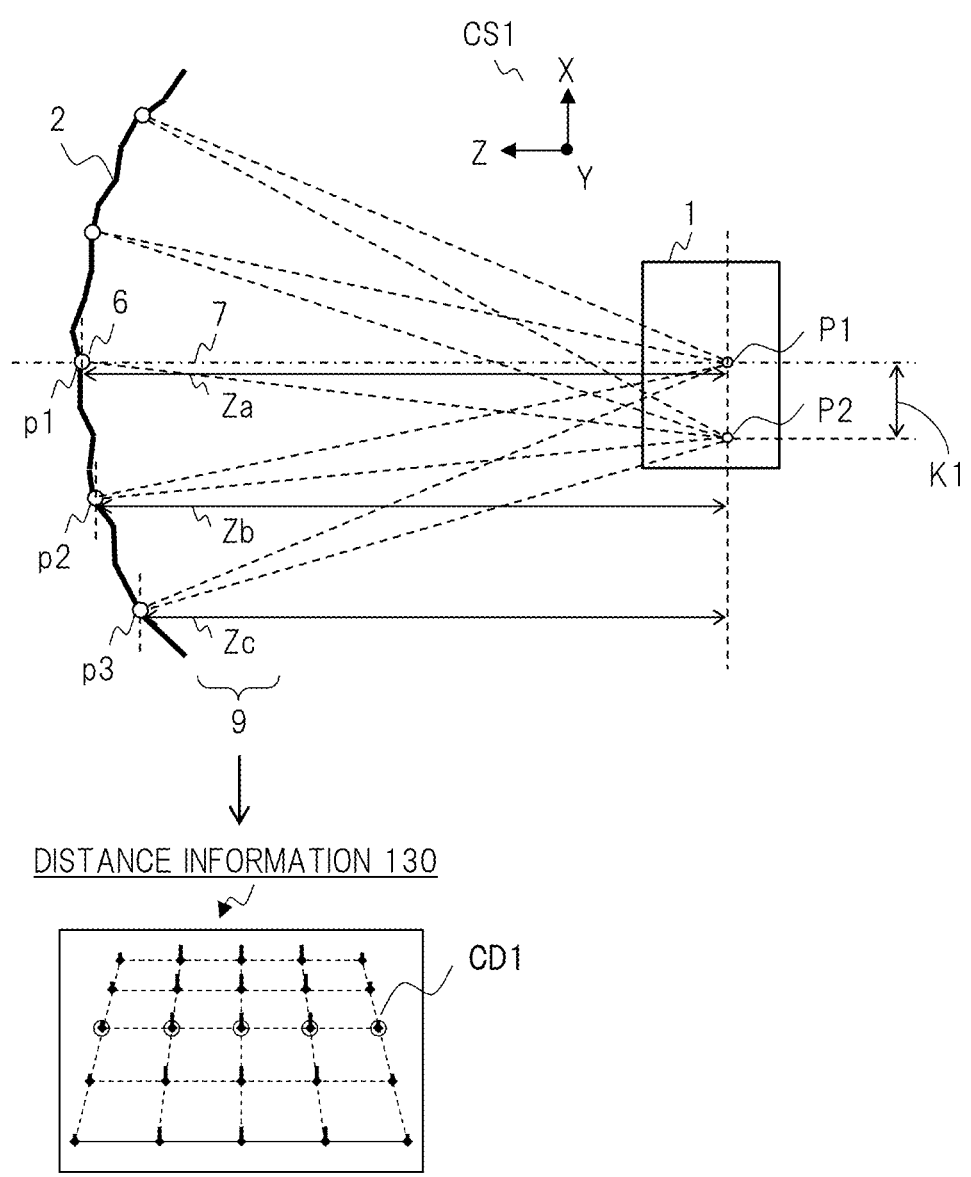
FIG. 5 is a diagram showing a screen distance in the first embodiment.

FIG. 5 shows a concept related to the screen distance 9. FIG. 5 shows the configuration on the X-Z plane in a top view. As shown in the drawing, the screen 2 has a plurality of irregularities in the plane. Lines from the position P1 of the projection lens 22 to the respective points (for example, points p1, p2, p3) of the projected image 3 and lines from the position P2 of the camera 10 to the same points are shown. The screen distance 9 is different at the respective points. The screen distance 9 has, for example, a distance Za to the point p1, a distance Zb to the point p2, and a distance Zc to the point p3. These differences in screen distance 9 reflect the shape of the irregularities of the surface of the screen 2. In this way, the projector 1 calculates the screen distance 9 at each point (corresponding grid point) and sets it as distance information 130 (grid point coordinates CD1 described later).

(8) Process

Figure 6:
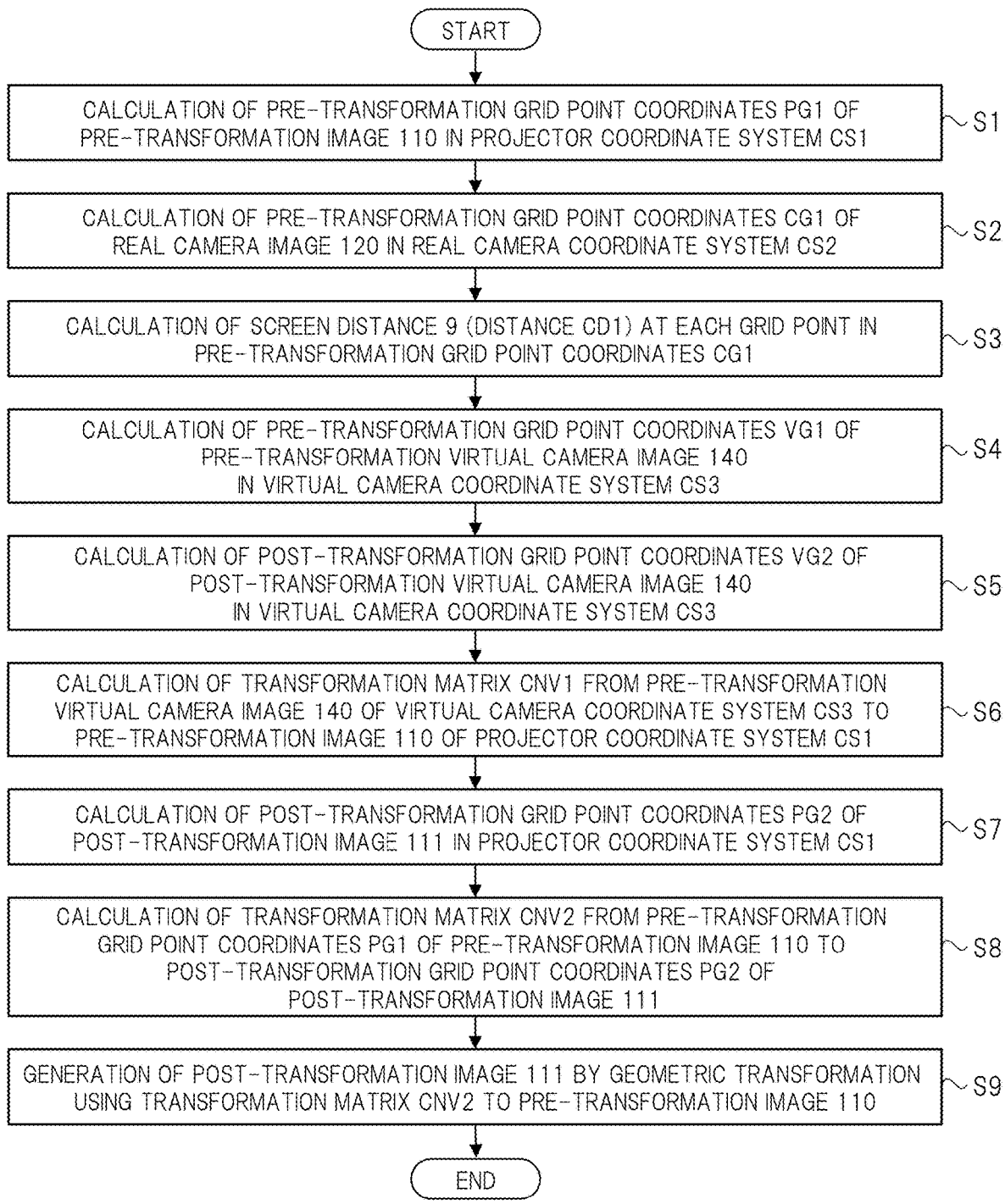
FIG. 6 is a diagram showing a main process flow of the image display apparatus according to the first embodiment.
Figure 7:
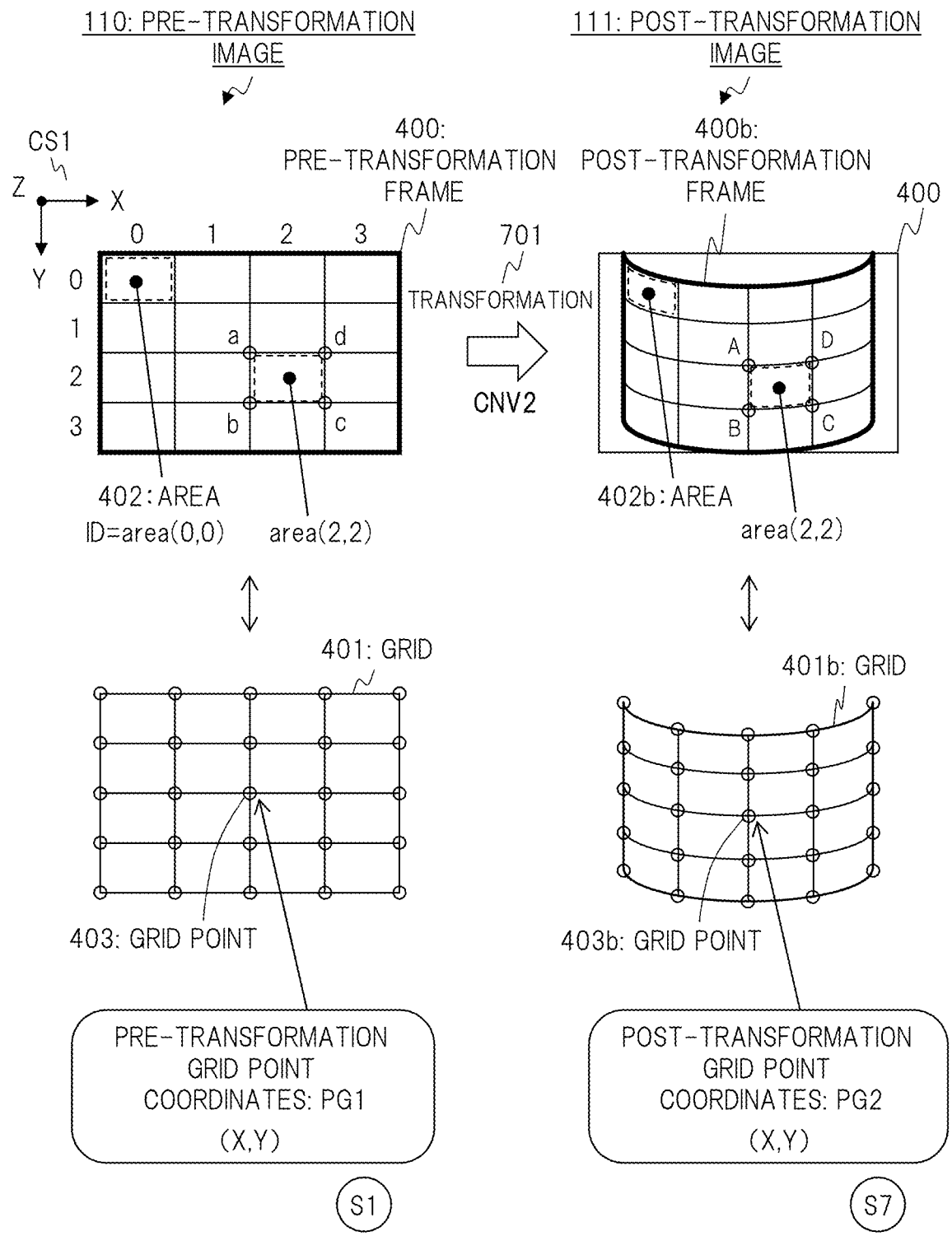
FIG. 7 is a diagram showing a configuration of a projected image, a grid, and the like before and after transformation in the first embodiment.
Figure 8:
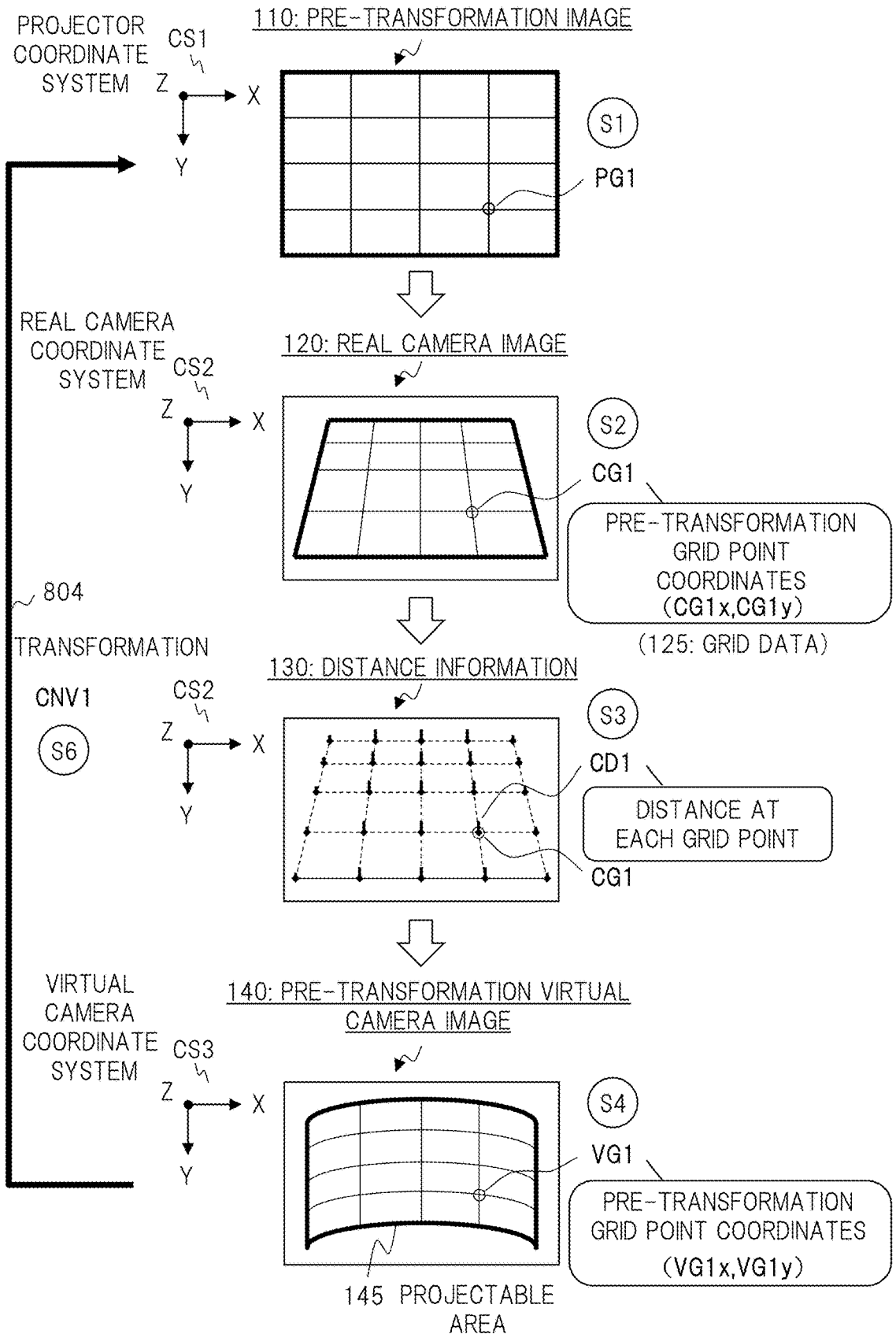
FIG. 8 is a diagram showing a projected image, a camera image, a screen distance, a virtual camera image, and the like in the first embodiment.
Figure 9:
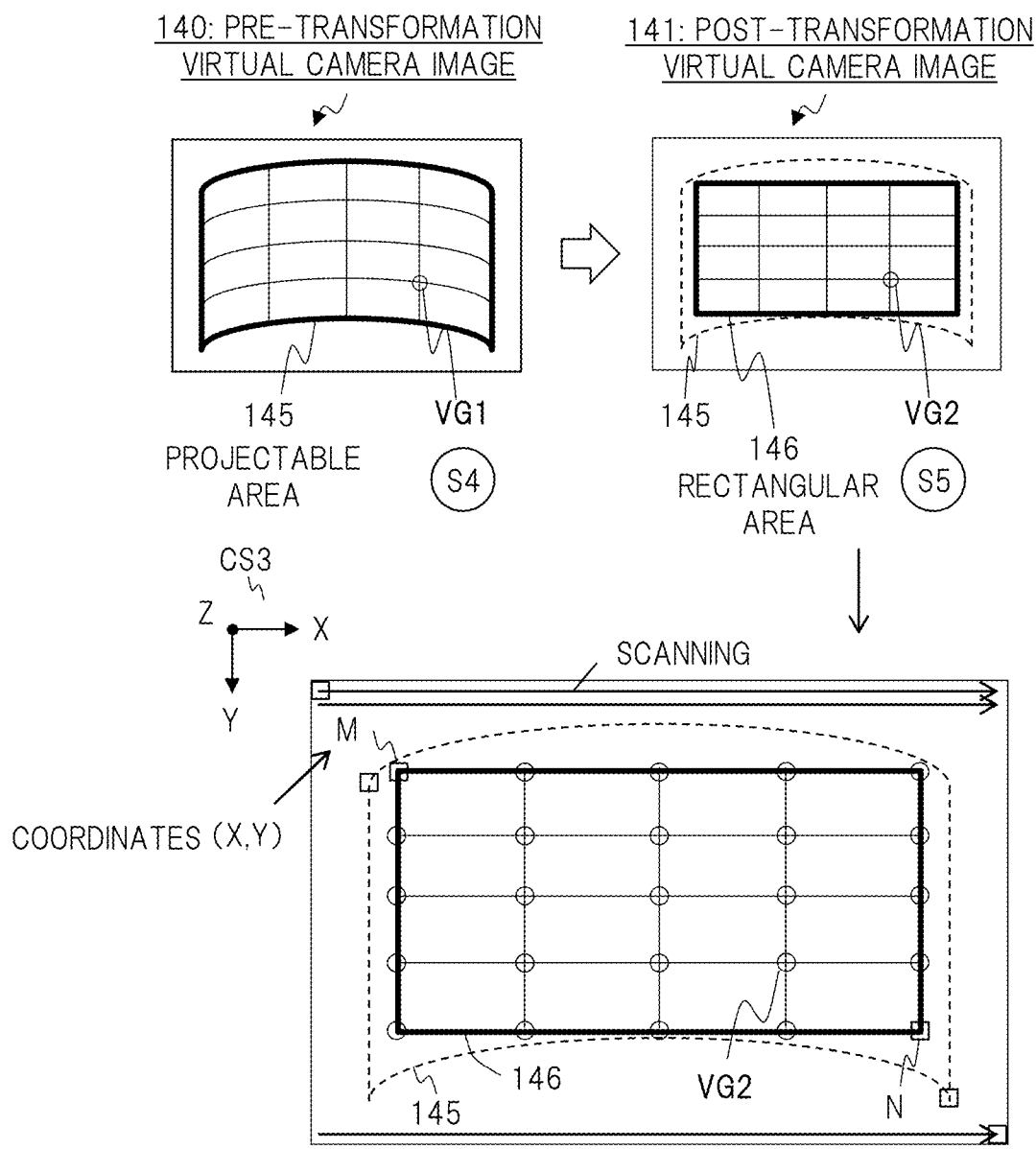
FIG. 9 is a diagram showing the virtual camera image before and after transformation in the first embodiment.
Figure 10:
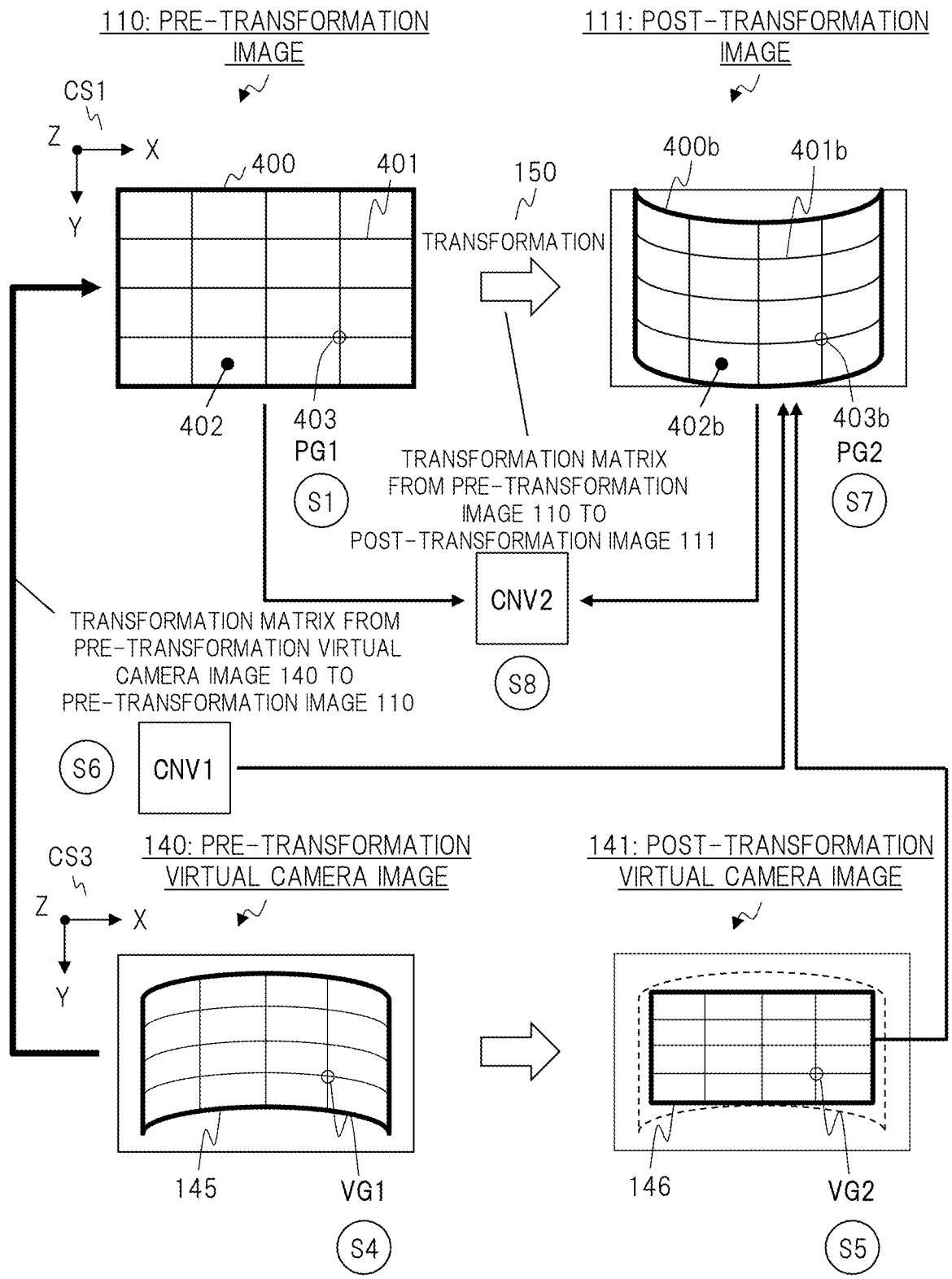
FIG. 10 is a diagram showing a first transformation matrix, a second transformation matrix, and the like in the first embodiment.

The main process of the image display apparatus according to the first embodiment will be described below with reference to the flow of FIG. 6, FIG. 7 to FIG. 10, and the like. FIG. 6 shows a flow of the main process related to the transformation function of the projector 1, and includes steps S1 to S9. FIG. 7 to FIG. 10 show the configuration corresponding to each step and the relationship between various images. FIG. 7 shows the configuration of the projected image, the grid, and the like before and after the transformation. FIG. 8 shows a projected image, a camera image, a screen distance, a virtual camera image, and the like. FIG. 9 shows virtual camera images before and after the transformation. FIG. 10 shows two transformation matrices and the like. In these drawings, in addition to the above-mentioned absolute coordinate system CS0, three types of coordinate systems such as (1) a projector coordinate system CS1, (2) a real camera coordinate system CS2, and (3) a virtual camera coordinate system CS3 are used as appropriate. In each coordinate system, the lateral direction corresponding to the image is the X axis and the longitudinal direction is the Y axis. The coordinate value on the X axis increases from left to right, and the coordinate value of the Y axis increases from top to bottom. The origin of each coordinate system is fixed at an appropriate position. Each axis of each coordinate system is similarly indicated by (X, Y, Z). Hereinafter, the flow will be described in order of steps.

[Step S1]

In step S1, the controller 50 or the transformation matrix calculating circuitry 12 calculates pre-transformation grid point coordinates PG1 of the pre-transformation image 110 in the projector coordinate system CS1. FIG. 7 shows the pre-transformation grid point coordinates PG1 (X, Y) and the like of the pre-transformation image 110. The controller 50 forms a grid 401 by evenly dividing an image frame (pre-transformation frame) 400 of the pre-transformation image 110 by the set division number in the projector coordinate system CS1. The grid 401 is composed of a plurality of rectangular areas 402 having the division number of, for example, 4×4. The grid 401 has a plurality of grid points 403. The four points that make up one area 402 are the grid points 403, respectively. The grid point 403 is the intersection of the boundary lines of the areas 402. The boundary lines are longitudinal and lateral dividing lines in accordance with the longitudinal and lateral division numbers.

[Step S2]

In step S2, the projector 1 generates the pattern image 101 (for example, a dot pattern) in the pattern generating circuitry 32, and projects the pattern image 101 onto the screen 2, with the geometric transform circuitry 30 set in a through state. The projector 1 captures the pattern image projected on the screen 2 by the camera 10 to obtain the real camera image 120. FIG. 8 shows the real camera image 120 and the like. The real camera image 120 includes a figure having distortion in association with the above-mentioned positional relationship. The coordinate system of the real camera image 120 and the distance information 130 is the real camera coordinate system CS2, and the coordinate system of the virtual camera image 140 is the virtual camera coordinate system CS3.

Then, in step S2, as shown in FIG. 8, the grid calculating circuitry 11 calculates pre-transformation grid point coordinates CG1 from the real camera image 120 in the real camera coordinate system CS2 by a predetermined process. This process is, for example, the calculation of the grid point coordinates corresponding to each dot of the dot pattern. The pre-transformation grid point coordinates CG1 are the coordinates (X, Y) of each grid point of the grid. The pre-transformation grid point coordinates CG1 are included in the grid data 125. In the process of step S2, the projector 1 can obtain information of the correspondence relationship about to which coordinates of the grid point of the real camera image 120 the coordinates of each grid point of the pre-transformation image 110 correspond. The pre-transformation grid point coordinates CG1 represent this correspondence relationship.

[Step S3]

The transformation matrix calculating circuitry 12 calculates a transformation matrix CNV2 from the pre-transformation image 110 to the post-transformation image 111 in FIG. 10 by performing the process of steps S3 to S8 by the use of the pre-transformation grid point coordinates CG1. This transformation matrix CNV2 corresponds to the geometric transformation matrix 150.

First, in step S3, the distance estimator 13 of the transformation matrix calculating circuitry 12 calculates the screen distance 9 (distance CD1) at the position of each grid point of the pre-transformation grid point coordinates CG1 in FIG. 8. The distance information 130 includes these distances CD1. The distance CD1 is the distance between the center position P1 of the projection lens 22 and each point of the screen 2 in the Z direction as in FIG. 5. The distance CD1 is defined as an absolute value of the difference between the Z-axis coordinate value of the grid point and the Z-axis coordinate value of the position P1 of the projection lens 22. The distance CD1 does not include the difference in the X-axis coordinate value and the difference in the Y-axis coordinate value. If the screen 2 is not flat, the distance CD1 can have different values for each grid point.

In FIG. 8, the distance information 130 shows the information of the distance CD1 (indicated by a bar as an explanatory image) superimposed on each grid point of the pre-transformation grid point coordinates CG1 of the real camera image 120. These distances CD1 show an example of spatial distribution. For example, the value of the distance CD1 is large near the center of the screen 2 because it is farther from the projector 1, and the value of the distance CD1 is small near both ends of the screen 2 in the X direction because they are closer to the projector 1.

A method of calculating the distance CD1 from each grid point of the pre-transformation grid point coordinates CG1 in step S3 will be described. In the first embodiment, for the sake of simplicity, the position P1 of the camera 10 and the position P2 of the projection lens 22 have the positional relationship in which the Y-axis coordinate values and the Z-axis coordinate values are the same and only the X-axis coordinate values are different, as in FIGS. 2(A) and 2(B). Since the X-axis coordinate values of the two positions P1 and P2 are different, the X-axis coordinate values of each grid point in the real camera image 120 vary in accordance with the screen distance 9. The distance estimator 13 of the projector 1 uses this to calculate the screen distance 9 (distance CD1).

[Calibration]

In this method, calibration is first used. The calibration will be described with reference to FIG. 11 and FIGS. 12(A) and 12(B). Prior to using the projector 1, this calibration is performed on the screen 2 in a certain environment.

FIG. 11 shows the positional relationship between the projector 1 and the screen 2A at the time of the calibration related to the transformation function of the projector 1. The screen 2A is flat. FIG. 11 schematically shows a plan view of the Y-Z plane. FIG. 11 shows two types of distances, that is, far and close distances 9F and 9N as the distances (corresponding screen distances 9) from the position of the projector 1 (position P1 of the corresponding projection lens 22) to the center position P3 of the screen 2A and to the center position P6 of the projected image 3 in the Z direction. The projector 1 uses these two types of distances to actually project and capture an image. The distance 9F (value corresponding thereto is CD1F) is the distance to the first position L1 which is relatively far, and the distance 9N (value corresponding thereto is CD1N) is the distance to the second position L2 which is relatively close.

As shown in FIG. 11, the projector 1 is installed at a position separated by the distance 9F (CD1F) with straightly facing the flat screen 2A. In this state, the projector 1 projects the pattern image 101 onto the screen 2A, with the geometric transform circuitry 30 set in a through state. The projector 1 calculates the grid point coordinates CG1F in the case of the distance of 9F based on the real camera image 120 obtained by capturing the pattern image 101 by the camera 10. Next, the projector 1 is installed at a position separated by the distance 9N (CD1N) while straightly facing the flat screen 2A. In this state, the projector 1 similarly projects the same pattern image 101 onto the screen 2A. The projector 1 calculates the grid point coordinates CG1N of the real camera image 120 in the case of the distance 9N. The two types of distances mentioned above have a relationship of CD1F>CD1N.

Here, the notation of the grid point coordinates will be described with using the pre-transformation grid point coordinates CG1 as an example. As shown in FIG. 8, the pre-transformation grid point coordinates CG1 indicate a set of all grid point coordinates of the grid in the real camera image 120. In this set, the coordinates of a certain grid point are expressed as CG1 (i, j). The subscript "i" represents a position or identifier in the X direction, and the subscript "j" represents a position or identifier in the Y direction. Also, the grid point coordinates CG1 (i, j) have an X-axis coordinate value corresponding to "i" and a Y-axis coordinate value corresponding to "j". The X-axis coordinate value is expressed as CG1$x$, and the Y-axis coordinate value is expressed as CG1$y$.

The screen distance 9 in the case where the non-flat screen 2 is placed at an arbitrary position is expressed as the distance CD1 (i, j). Since this distance CD1 (i, j) may differ depending on the grid points, subscripts (i, j) are added for distinction. This distance CD1 (i, j) can be calculated by using the grid point coordinates CG1 in the real camera image 120 as shown by Equation 2 below.

$$\begin{cases} CD1(i,j) = A \times (CD1F - CD1N) + CD1N \\ A = \dfrac{CG1x - CG1Nx}{CG1Fx - CG1Nx} \end{cases} \quad \text{(Equation 2)}$$

In Equation 2, the distance CD1F is the distance value corresponding to the farther distance 9F in FIG. 11, and the distance CD1N is the distance value corresponding to the closer distance 9N. Since the distance CD1F and the distance CD1N are measured by using the flat screen 2A straightly facing the projector 1 as shown in FIG. 11, they are constant values regardless of the positions of the grid points, and the subscripts (i, j) thereof are omitted.

In step S3, the projector 1 calculates the distance CD1 at each grid point in accordance with the Equation 2 by using the distances CD1F and CD1N previously measured by calibration, the corresponding grid point coordinates CG1F and CG1N, and the pre-transformation grid point coordinates CG1 calculated in the actual environment of the user.

Note that the above-described calibration may be set by the actual capturing in the environment of the user, but it is also possible to perform it, for example, before the product shipment. Namely, the distances CD1F and CD1N and the grid point coordinates CG1F and CF1N may be measured by calibration at the time of manufacturing the product of the projector 1 and set in the projector 1 in advance. In addition, the calibration value can also be calculated from the characteristics of each component, the mounting position, and the like at the time of manufacturing the product. These values are stored as set values in, for example, the memory 52 or the processing circuitry 40 (particularly, the transformation matrix calculating circuitry 12) of FIG. 3.

[Step S4]

In step S4, the transformation matrix calculating circuitry 12 of the projector 1 generates the pre-transformation grid point coordinates VG1 of the pre-transformation virtual camera image 140 in the virtual camera coordinate system CS3 of FIG. 8 by the use of the distance CD1 at each grid point in the real camera image 120. The pre-transformation virtual camera image 140 can be calculated by using a known three-dimensional matrix calculation, but the calculation speed is prioritized in the first embodiment and a simpler method is used as follows.

Under the installation conditions of the calibration described above, as shown in FIGS. 12(A) and 12(B), the projector 1 calculates pre-transformation grid point coordinates VG1F and VG1N in the pre-transformation virtual camera image 140 seen from the position P5 of the virtual viewpoint 5, for both distances CD1F and CD1N. FIGS. 12(A) and 12(B) show the grid points in the real camera image 120 and the pre-transformation virtual camera image 140, which correspond to the capturing at two types of distances 9F and 9N in the calibration of FIG. 11. An image 120F shows an example of the real camera image 120 at the far distance 9F. The image 120F has grid point coordinates CG1F, and the coordinate values thereof are (CG1Fx, CG1Fy). An image 120N shows an example of the real camera image 120 at the close distance 9N. The image 120N has grid point coordinates CG1N, and the coordinate values thereof are (CG1Nx, CG1Ny). An image 140F shows an example of the virtual camera image 140 at the far distance 9F. The image 140F has grid point coordinates VG1F, and the coordinate values thereof are (VG1Fx, VG1Fy). An image 140N shows an example of the virtual camera image 140 at the close distance 9N. The image 140N has grid point coordinates VG1N, and the coordinate values thereof are (VG1Nx, VG1Ny). The projector 1 also stores the grid point coordinates VG1F and VG1N acquired in this manner in the memory 52 and the like so as to be associated with the grid point coordinates CG1F and CG1N.

Here, the grid point coordinates of the pre-transformation virtual camera image 140 when the screen distance 9 in the case of placing the non-flat screen 2 at an arbitrary position is the distance CD1 (i, j) can be calculated by the following Equation 3. Note that this Equation 3 is effective even when the screen 2 is flat.

$$\begin{cases} VG1x = B \times (VG1Fx - VG1Nx) + VG1Nx \\ VG1y = B \times (VG1Fy - VG1Ny) + VG1Ny \\ B = \dfrac{CD1(i,j) - CD1N}{CD1F - CD1N} \end{cases} \quad \text{(Equation 3)}$$

In the example of FIG. 8, the distance CD1 (CD1F, CD1N) at each grid point and the grid point coordinates VG1F and VG1N are applied to the Equation 3. By this means, the projector 1 can calculate the pre-transformation grid point coordinates VG1 (VG1$x$, VG1$y$) in the pre-transformation virtual camera image 140.

The pre-transformation virtual camera image 140 of FIG. 8 includes a projectable area 145, which is an area having distortion. As described above, geometric distortion due to the shape of the curved surface of the screen 2 and the like occurs in the pre-transformation grid point coordinates VG1.

[Step S5]

Therefore, in the first embodiment, in step S5, the transformation matrix calculating circuitry 12 of the projector 1 calculates a rectangular area 146 included in the projectable area 145 of the pre-transformation virtual camera image 140 as shown in FIG. 9. In the first embodiment, the pre-transformation image 110 is geometrically transformed to fit it into the rectangular area 146. Step S5 is the process for that purpose. In step S5, the transformation matrix calculating circuitry 12 calculates the rectangular area 146 of the post-transformation virtual camera image 141 from the projectable area 145 of the pre-transformation virtual camera image 140 in the virtual camera coordinate system CS3. A process example for the calculation of the rectangular area 146 is shown below.

FIG. 9 shows the pre-transformation virtual camera image 140 and the post-transformation virtual camera image 141. The coordinate system in FIG. 9 is the virtual camera coordinate system CS3. In the first embodiment, the rectangular area 146 is a rectangle having no distortion. The transformation matrix calculating circuitry 12 calculates the rectangular area 146 included in the projectable area 145 in accordance with the process example shown in FIG. 13. Here, the post-transformation virtual camera image 141 is shown in an enlarged manner on the lower side of FIG. 9 to show a method of searching for the rectangular area 146 included in the projectable area 145. The rectangular area 146 can be represented by two points M and N. The point M is the upper left point of the rectangular area 146, and the point N is the lower right point of the rectangular area 146. The transformation matrix calculating circuitry 12 searches for the points M and N by sequentially scanning each coordinate point so as to cover the entire post-transformation virtual camera image 141. Consequently, the transformation matrix calculating circuitry 12 calculates the rectangular area 146 with two points M and N satisfying the conditions to be included in the projectable area 145.

Process Example

FIG. 13 shows the flow of the process example in step S5, and it includes steps S51 to S59. The transformation matrix calculating circuitry 12 searches for the points M and N that satisfy the conditions by scanning all the coordinate points (corresponding pixels) within the range of the post-transformation virtual camera image 141 of FIG. 9. As the scanning method, for example, a line sequential scanning method (a method of scanning a line in the in-plane horizontal direction and sequentially scanning the lines similarly in the in-plane vertical direction) is used, but the method is not limited to this. In step S51, the transformation matrix calculating circuitry 12 initializes the coordinates of the points M and N in FIG. 9. For example, at first, both of the points M and N are initialized to the point at the upper left position of the post-transformation virtual camera image 141, but the present invention is not limited to this. In step S52, the transformation matrix calculating circuitry 12 confirms the positional relationship between the point M and the point N. The condition of step S52 is whether the points M and N are the upper left point and the lower right point of the rectangle. If the point N is located at the lower right position with respect to the point M in this confirmation (Y), the flow proceeds to step S53, and if not (N), the flow proceeds to step S56.

In step S53, the transformation matrix calculating circuitry 12 confirms whether or not the entire rectangle defined by the points M and N is included in the projectable area 145. If it is included (Y), the flow proceeds to step S54, and if it is not included (N), the flow proceeds to step S56. A plurality of types of rectangles are conceivable as the rectangle defined by the points M and N, but only the rectangle whose sides are all parallel to the X axis or the Y axis is used in this process example. In step S54, the transformation matrix calculating circuitry 12 calculates the area of the rectangle defined by the points M and N. The condition of step S54 is whether or not this area is maximum. If this area is larger than the area calculated in step S54 in the past (Y), the flow proceeds to step S55, and if it is not larger (N), the flow proceeds to step S56.

At the time of step S55, all of the three conditions of steps S52, S53, and S54 are satisfied. Therefore, the transformation matrix calculating circuitry 12 stores the information of the points M and N at that time as the information representing the candidates of the rectangular area 146 to be obtained. In step S56, the transformation matrix calculating circuitry 12 confirms whether or not all the points N in the range have been scanned, and the flow proceeds to step S57 if scanned, and proceeds to step S58 if not scanned. In step S57, the transformation matrix calculating circuitry 12 confirms whether or not all the points M in the range have been scanned, and the flow is ended if scanned, and proceeds to step S59 if not scanned. In step S58, the transformation matrix calculating circuitry 12 updates the coordinates of the point N, and the flow returns to step S52. In step S59, the transformation matrix calculating circuitry 12 updates the coordinates of the point M, and the flow returns to step S52. The order of updating the point coordinates is not limited, and may be selected in accordance with the scanning method.

By such a process, an appropriate rectangular area 146 satisfying the conditions can be obtained. This rectangular area 146 is the area in which the corrected image should be projected in the post-transformation virtual camera image 141. The projector 1 divides the rectangular area 146 evenly into a plurality of areas in accordance with the division number (for example, 4×4) to form the grid, thereby obtaining the post-transformation grid point coordinates VG2 in the post-transformation virtual camera image 141.

[Step S6]

The virtual camera image (corresponding post-transformation grid point coordinates VG2 of the post-transformation virtual camera image 141 in FIG. 9) cannot be directly corrected by geometric transformation. Therefore, in the first embodiment, the projector 1 indirectly realizes the correction of the virtual camera image by correcting the pre-transformation image 110 by geometric transformation. Step S6 is the process for this correction. In step S6, the transformation matrix calculating circuitry 12 of the projector 1 calculates a transformation matrix CNV1 (first transformation matrix) between the pre-transformation virtual camera image 140 in the projector coordinate system CS1 and the pre-transformation image 110 in the virtual camera coordinate system CS3 as shown in FIG. 8. This transformation matrix CNV1 is the projective transformation matrix from the pre-transformation virtual camera image 141 to the pre-transformation image 110. The transformation 804 in FIG. 8 shows the transformation using the transformation matrix CNV1, and step S6 is the calculation of the transformation matrix CNV1.

As described above, the plane-to-plane projective transformation matrix can be calculated from the correspondence relationship of the coordinates of the four points. Therefore, the transformation matrix calculating circuitry 12 can calculate the transformation matrix CNV1 for each divided area by using the known pre-transformation grid point coordinates VG1 of the pre-transformation virtual camera and the pre-image 140 transformation grid point coordinates PG1 of the pre-transformation image 110. This projective transformation matrix is composed of different matrices for each divided area. The area is expressed as (i, j), and the projective transformation matrix for each area is expressed as CNV1 (i, j).

[Step S7]

The transformation matrix CNV1 from the pre-transformation virtual camera image 140 to the pre-transformation image 110 can actually be used as a projective transformation matrix from the post-transformation virtual camera image 141 to the post-transformation image 111. Therefore, in the first embodiment, by applying this transformation matrix CNV1 to the post-transformation grid point coordinates VG2 of the post-transformation virtual camera image 141, the post-transformation grid point coordinates PG2 of the post-transformation image 111 can be calculated as shown in FIG. 10. In step S7, the transformation matrix calculating circuitry 12 calculates the post-transformation grid point coordinates PG2.

In practice, the transformation matrix CNV1 is composed of different matrices for divided areas. Therefore, for example, the following process is required in order to calculate the post-transformation grid point coordinates PG2. This process example includes the following steps. In the first step, the transformation matrix calculating circuitry 12 selects the coordinates of one grid point in one area in the post-transformation grid point coordinates VG2. In the second step, the transformation matrix calculating circuitry 12 examines which area of the grid of the pre-transformation virtual camera image 140 the coordinates of the grid point of the area selected in the first step belong to, in other words, which area the coordinates correspond to. In the third step, the transformation matrix calculating circuitry 12 applies the transformation matrix CNV1 corresponding to the area examined in the second step to the grid point selected in the first step. Consequently, the post-transformation grid point coordinates PG1 corresponding to the selected grid point are obtained. The transformation matrix calculating circuitry 12 performs the process of the first to third steps for all the points included in the post-transformation grid point coordinates VG2. As a result, all the post-transformation grid point coordinates PG2 are obtained.

[Step S8]

In the steps so far, the pre-transformation grid point coordinates PG1 of the pre-transformation image 110 obtained in step S1 and the pre-transformation grid point coordinates PG2 of the post-transformation image 111 obtained in step S7 are known. In step S8, the transformation matrix calculating circuitry 12 of the projector 1 calculates the transformation matrix CNV2 (second transformation matrix) by using these known information as shown in FIG. 10. This transformation matrix CNV2 is a projective transformation matrix from the pre-transformation image 110 to the post-transformation image 111. This transformation matrix CNV2 is composed of a matrix for each divided area. Since the coordinates of the four vertices before and after the transformation are known for each area, this projective transformation matrix can be calculated in accordance with the method described above. The transformation matrix calculating circuitry 12 sets the obtained transformation matrix CNV2 as the geometric transformation matrix 150 in the geometric transform circuitry 30.

[Step S9]

In step S9, the geometric transform circuitry 30 of the projector 1 generates the post-transformation image 111 by applying the corresponding transformation matrix CNV2 to each area of the pre-transformation image 110 to perform geometric transformation. The geometric transform circuitry 30 obtains the post-transformation image 111 by performing the similar process with respect to all of the divided areas and synthesizing the obtained images for each area.

(9) Transformation and Division

A supplementary explanation about the transformation 701 from the pre-transformation image 110 to the post-transformation image 111 using the transformation matrix CNV2 will be given with reference to FIG. 7. The pre-transformation image 110 has a rectangular pre-transformation frame 400. The post-transformation image 111 has a post-transformation frame 400b, which is a figure having distortion. The projector 1 constitutes the grids 401 and 401b by dividing each of these images into a plurality of areas 402 and 402b in accordance with the set division number. This example shows the case where the division number is 4×4. For example, in one image frame 400, the side in the X direction is divided into four, and the side in the Y direction is divided into four. Consequently, a total of 16 areas 402 (4×4) are formed. Each area is identified by a predetermined ID. For example, the upper left area has ID=area (0, 0).

For example, an attention will be paid to the area 402 of ID=area (2, 2). This area 402 has a substantially quadrangular shape and has four grid points 403. It is assumed that the coordinates of the four points a, b, c, and d in the pre-transformation image 110 and the coordinates of the corresponding four points A, B, C, and D in the post-transformation image 111 are given to this area 402. In that case, the matrix for the projective transformation of the image in this area 401 can be uniquely calculated. The same can be applied for each area of the entire image frame. When the coordinates of all the grid points 403 and 403b of the grids 401 and 401b are obtained in the set of the pre-transformation image 110 and the post-transformation image 111, the transformation matrix can be calculated for each of the divided areas 402 and 402b. By performing the projective transformation using each of these transformation matrices, the projector 1 can transform the entire image such that there is no geometric distortion.

In the example shown in FIG. 7 and the like, the division number of the grid is shown as a small number of 4×4 in consideration of simplicity, but the number is not limited to this. In practice, the larger division numbers, for example, 16×16, 32×32, 64×64, and 128×128 are also possible. In an implementation example, this division number is set to, for example, 64×64. Also, the division number may be changed by user setting through GUI. When the division number is large, that is, when the grid is fine, the adaptability to the irregular shape of the screen 2 related to the transformation is improved, so that the image quality can be improved. Therefore, from the perspective of giving priority to the image quality, it is better to set the division number as large as possible. From the perspective of considering the processing load, processing speed, circuit scale, and the like of the image display apparatus, the division number may be set to a smaller number. Depending on the implementation, the maximum number is set for this division number. The projector 1 can apply the division number selected from a plurality of division numbers within a range having the maximum division number as the upper limit.

(10) GUI Example

FIG. 14 shows a display example of the GUI menu related to the transformation function in the first embodiment. When using the transformation function, the user sets the transformation function to the ON state in advance by the user setting. For example, the user operates a remote controller to make the projector 1 display such a menu. This menu includes the setting item for ON/OFF related to "transformation function (correction of distortion generated on curved screen)". ON indicates valid and OFF indicates invalid. Further, when displaying a desired image, the user specifies a target image (for example, a file) in accordance with the display of the menu and presses the start button. The projector 1 executes the above-mentioned process in response to the pressing of the start button. Namely, the projector 1 first projects the pattern image 101 at a certain time, captures the state by the camera 10, calculates the geometric transformation matrix 150, and sets the geometric transformation matrix 150 in the geometric transform circuitry 30. Then, the projector 1 performs the geometric transformation of the image specified by the user by the geometric transform circuitry 30, and projects the post-transformation image 111 onto the screen 2. In addition, in the example of the menu of FIG. 14, the setting item for specifying the file has been described as the example of specifying the target image. When the image is input to the input/output/communication interface 53 from a plurality of image input sources, the display for selecting an image input source to be the target image from the plurality of image input sources may be provided instead of the setting item. When selecting the image input source on a menu screen different from the menu shown in FIG. 14, the menu itself shown in FIG. 14 does not have to be provided with the setting items for specifying the file of the target image and selecting the image input source to be the target image. Further, in the example of the menu of FIG. 14, an example of displaying a start button for the user to select whether or not to "start transformation" has been described, but the process of the transformation function may be started at the time when the ON is selected in the ON/OFF setting items related to "transformation function (correction of distortion generated on curved screen)". In this case, it is not necessary to provide the setting item of the start button for selecting the start of transformation in the menu of FIG. 14 separately from the ON/OFF setting item related to the "transformation function".

Note that such a GUI is not limited to the display on the screen 2, and may be realized by the user interface 51 of the main body of the projector 1, for example, a dedicated operation button 51*a* or an operation panel or may be realized by the image source device 4.

(11) Effect

As described above, in the image display apparatus according to the first embodiment, the geometric distortion caused by the irregularities and curved surface of the screen 2 can be automatically corrected by the use of the camera 2 built in the projector 1. The projector 1 calculates the screen distance 9 from the image of the camera 10 and performs the correction from the projectable area 145 of the virtual camera image by using this distance, thereby calculating the rectangular area 146 (FIG. 9). The projector 1 calculates the transformation matrix CNV1 and calculates the post-transformation grid point coordinates PG2 from the rectangular area 146 and the transformation matrix CNV1 (FIG. 10). Then, the projector 1 calculates the transformation matrix CNV2. Consequently, when the user sees the projected image 3 on the curved screen 2 from a position within the range including the virtual viewpoint 5, the user can see a suitable image without geometric distortion. The user can eliminate or significantly reduce the adjustment work such as the installation of the camera separate from the projector at the viewpoint position and the setting for the capturing by the camera with respect to the screen 2 as the application target. The user does not have to manage the separate camera or the like. Therefore, the usability for the user can be improved.

In the case of FIGS. 2(A) and 2(B) of the first embodiment, since the projector 1 is installed on the horizontal plane 80, the straight line 8 connecting the virtual viewpoint 5 and the image center 6 is a horizontal line parallel to the horizontal plane 80. Regardless of the direction in which the screen 2 is oriented, the projected image 3 is corrected such that it looks like a rectangle when seen from the virtual viewpoint 5. When the screen 2 has a flat surface, trapezoidal distortion does not occur in the projected image 3, and when the screen 2 has a curved surface, transformation in accordance with the shape of the curved surface is performed, and then the image is corrected such that it looks like a rectangle when seen from the virtual viewpoint 5. At the time of this correction, the projected image 3 is corrected such that the upper side and the lower side are parallel to the horizontal plane 80 on the screen 2 and the right side and the left side are perpendicular to these sides. Therefore, the projected image 3 is in a state as if a rectangular image is attached to the screen 2, and the user can see the projected image 3 with little discomfort from any direction.

The following is also possible as a modification of the first embodiment. As a modification, the projector 1 may dynamically change the content of the pattern image 101. For example, the controller 50 determines a suitable division number in accordance with the state such as the shape of irregularities of the screen 2 at that time. The controller 50 selects an appropriate division number within a range equal to or less than the maximum division number of the apparatus, generates the pattern image 101 having contents corresponding to the division number, and performs the dynamic switching.

Second Embodiment

An image display apparatus according to the second embodiment of the present invention will be described with reference to FIG. 15 to FIG. 19. The basic configuration of the second embodiment and the like is the same as the configuration of the first embodiment, and the components of the second embodiment and the like different from those of the first embodiment will be described below. The image display apparatus according to the second embodiment has a function of adjusting the transformation content in accordance with the attitude state of the projector 1 and the actual viewpoint position of the user, in addition to the transformation function in the first embodiment.

(2-1) Adjustment Function Corresponding to Inclination

The projector 1 according to the second embodiment has a function to correct geometric distortion in consideration of inclination (sometimes referred to as an adjustment function) when the installation state of the main body of the projector 1 has the inclination to the standard state (for example, FIG. 1). This adjustment function enables the adjustment based on the operation of the user through the GUI with respect to the basic transformation function in the first embodiment. The inclination state of the main body of the projector 1 is roughly classified into the following three types.

(1) Inclination in the vertical direction due to rotation around the X axis. An example thereof is shown in FIG. 15. Due to this inclination, trapezoidal distortion in which lengths of upper and lower sides in the Y direction are different appears in the projected image. (2) Inclination in the left-right direction due to rotation around the Y axis. An example thereof is shown in FIG. 18. Due to this inclination, trapezoidal distortion in which lengths of left and right sides in the X direction are different appears in the projected image. (3) Inclination due to rotation around the Z axis. An example thereof is shown in FIG. 19. Due to this inclination, a rectangle inclined to the left or right appears in the projected image.

The adjustment function in the second embodiment is the function to correct the image for each inclination of each axis (X, Y, Z) and the corresponding geometric distortion such that the image in the standard state with no inclination can be seen. With respect to the correction function for each axis, the correction function for any one axis, the correction function for any two axes, or the correction function for all of three axes may be implemented. Alternatively, the function to be applied may be selected by the user setting.

(2-2) Adjustment Function—X Axis

FIG. 15 shows a case where the attitude of the projector 1 is inclined around the X axis, in other words, inclined up and down in the Y direction. The adjustment function corresponding to the up-and-down inclination around the X axis is as follows. In the state of FIG. 15, the projector 1 is placed on the horizontal plane 80 with an upward inclination at an angle α around the X axis. This inclination is the state in which the front side of the bottom surface 81 of the projector 1 is higher than the rear side and the projector 1 is directed obliquely upward. The angle formed by the horizontal plane 80 and the bottom surface 81 of the main body of the projector 1 is the angle α. In other words, this state is the state in which the main body of the projector 1 is rotated upward at the angle around the X axis from the state shown in FIGS. 2(A) and 2(B). The projector coordinate system CS1 is changed to a coordinate system reflecting the rotation around the X axis so as to correspond to the inclination of the angle α. Correspondingly, the angle formed by a straight line 8b passing through the virtual viewpoint 5 and the horizontal line is the angle α.

In this case, as the projector 1 rotates, the straight line 8b connecting the position P5 of the virtual viewpoint 5 and the position P6 of the projection center 6 is also rotated at the angle α, and is not the horizontal line. In this state, the correction by the projector 1 is the correction that makes the projected image 3 look like a rectangle when seen from the position P5 of the virtual viewpoint 5 (referred to as a first viewpoint) on the straight line 8b. Therefore, in this state, when the user sees the projected image 3 from the position deviated from the position P5 of the first viewpoint, geometric distortion, for example, trapezoidal distortion occurs. For comparison, the position P1b of the projection lens 22 and the position P2b of the camera 10 corresponding to the case of FIGS. 2(A) and 2(B) are also shown.

In the second embodiment, when the projector 1 is inclined as described above, a second viewpoint 25 (second virtual viewpoint 25) which is the assumed standard viewpoint position of the user is set instead of the original virtual viewpoint 5 (first virtual viewpoint). The second viewpoint 25 is set on a straight line 8c which passes through the position P6 of the projection center 6 of the projected image 3 and is a horizontal line in the Z direction. In other words, a position P25 of the second viewpoint 25 is obtained by rotating the position P5 of the first viewpoint at the angle α.

The projector 1 according to the second embodiment adjusts the contents of the above-mentioned transformation (specifically, the shape of the rectangular area 146 or the like in FIG. 9) in accordance with the state of this inclination such that the geometric distortion is eliminated when seen from the position P25 of the second viewpoint 25. From another perspective, this transformation function of the projector 1 is a function of adjusting the position of the virtual viewpoint 5 based on the viewpoint position of the user and the operation of the user through the GUI.

(2-3) Process

FIG. 16 shows an example of process contents and a virtual camera image when the projector 1 is inclined around the X axis as shown in FIG. 15. For comparison, a rectangular area 146 and the like of the post-transformation virtual camera image 141 related to the process of step S5 described above are shown on the upper side of FIG. 16. A quadrangular area 147 and the like in the post-transformation virtual camera image 141B related to the process of step S5B in the second embodiment instead of step S5 are shown on the lower side of FIG. 16. In the second embodiment, the main change in the adjustment function from the first embodiment is that the process content of step S5 is changed to step S5B. In step S5 described above, the projector 1 calculates the rectangular area 146 (rectangle) included in the projectable area 145. On the other hand, in step S5B, the projector 1 calculates the quadrangular area 147 included in the projectable area 145 as shown in FIG. 16. The quadrangular area 147 is, for example, a trapezoidal area. The quadrangle of the area 147 corresponds to the shape of the area in the case where the area, which becomes a rectangle when seen from the virtual viewpoint (second viewpoint) 25, is seen from the virtual viewpoint (first viewpoint) 5. The shape of the quadrangle of this area 147 is determined in accordance with the installation state of the projector 1 and the actual viewpoint position of the user. Since this quadrangle is composed of a group of grid points, the concept of this quadrangle includes a schematic quadrangle.

In the example of FIG. 15, if the angle α is known, the size of the four corners and the direction of each side of the quadrangular area 147 are uniquely determined. Therefore, for example, the quadrangular area 147 having the largest area can be determined by the same process as in FIG. 9 described above. When the coordinates of the four vertices of the quadrangular area 147 are obtained, the projective transformation matrix for the transformation of the quadrangular area 147 into the rectangular area 146 and the projective transformation matrix for the inverse transformation thereof can be calculated. Therefore, the projector 1 can calculate the grid point coordinates in the quadrangular area 147 by using these transformation matrices. In step S5B, the transformation matrix calculating circuitry 12 calculates the quadrangular area 147 in the post-transformation virtual camera image 141B, and calculates the post-transformation grid point coordinates VG2 in the area 147.

As an example of this process, the transformation matrix calculating circuitry 12 performs projective transformation of the quadrangular area 147 to a square area having a length of 1 on each side, divides this area evenly in accordance with the number of grid points, and calculates the grid point coordinates in this square area. Next, the transformation matrix calculating circuitry 12 calculates the grid point coordinates VG2 in the quadrangular area 147 by applying the above-mentioned projective transformation from the square area to the quadrangular area 147 for each grid point coordinate.

(2-4) GUI Example

The shape and orientation of the quadrangular area 147 can be obtained by calculation based on the installation state of the projector 1 and the actual viewpoint position, and the setting menu related to this adjustment function may be provided through the GUI and the selector 31 as shown below. The projector 1 accepts user operations related to the adjustment function through the setting menu and the user interface 51, calculates the shape and orientation of the area 147 in accordance with the state of operation, and performs adjustment in real time.

FIG. 17 shows a display example of the setting menu of the GUI on the screen 2 related to the adjustment function in the second embodiment. The "setting menu" of FIG. 17 includes slide bars B01, B02, and B03 as setting items with respect to the adjustment of each axis (X, Y, Z) related to the adjustment function ([distortion adjustment]). It is also possible to provide ON/OFF setting for the adjustment of each axis.

The user sees the projected image 3 on the screen 2 from the actual viewpoint position. In that state, when the user feels that the projected image 3 has distortion due to the inclination of the projector 1, the user can make an adjustment by using this adjustment function. When the user wants to make an adjustment, the user operates the projector 1 to display the setting menu and makes the desired adjustment related to the inclination of the axis while watching the setting menu. For example, when the user feels a trapezoidal distortion in the projected image 3 in the Y direction, the user operates the slide bar B01 in order to make the adjustment on the X axis. In the slide bar B01, a trapezoid with a short upper side is displayed on the left side and a trapezoid with a short lower side is displayed on the right side as a guide. For example, the user moves the slide bar B01 from the center standard position to the right. As a result, the projector 1 applies correction (known keystone correction) in the vertical direction around the X axis to the projected image 3 in accordance with the position of the slide bar B01. By this correction, the shape of the projected image 3 can be adjusted to a suitable shape without distortion when seen from the actual viewpoint position of the user.

The correction process at the time of this adjustment can be realized in detail by the following process example. In FIG. 3, the controller 50 of the projector 1 detects the operation and position of the slide bar B01 by the user through the operation button 51a or the remote controller interface 51b of the user interface 51. The controller 50 grasps the degree of adjustment related to the shape of the image from the operation and position of the slide bar B01. The controller 50 determines the shape of outer circumference in the grid point coordinates VG2 of the rectangular area 146 of the post-transformation virtual camera image 141 of FIG. 9, that is, the shape of outer circumference of the grid point coordinates VG2 (for example, trapezoid) of the corresponding rectangular area 147 of FIG. 16 in accordance with the value of the degree. In the operation example of FIG. 17, the shape of the outer circumference is determined as a trapezoidal shape with a short lower side.

Thereafter, the projector 1 similarly executes the process from step S5B (corresponding process example of FIG. 13). In this process example, step S53 is changed from "rectangle defined by point M and point N" to "quadrangle defined by point M, point N, and shape of outer circumference of area 147 (grid point coordinates VG2)". When the process of FIG. 6 is fully executed, the projected image 3 on the screen 2 becomes an image in which distortion due to inclination is reduced, reflecting the operation and position of the slide bar B01 by the user.

Note that the setting menu of FIG. 17 may have the configuration used in common with the setting menu for the keystone correction function corresponding to the case of the flat screen, provided in a conventional general projector. In this case, the user can adjust the geometric distortion of the projected image 3 on the screen 2 having a curved surface as if the user is operating a conventional keystone correction function. The user can further adjust the projected image 3 in which the geometric distortion has been automatically corrected by the transformation function of the first embodiment, by using the adjustment function of the second embodiment such that the image can be seen more suitably in accordance with the actual viewpoint position.

(2-5) Adjustment Function—Y Axis

The adjustment function corresponding to the left-right inclination around the Y axis is as follows. The adjustment function related to the Y axis can also be realized by basically the same mechanism as the adjustment function related to the X axis described above. FIG. 18 shows a case where the attitude of the projector 1 is inclined around the Y axis, in other words, inclined to left or right in the X direction. FIG. 18 schematically shows a configuration on the X-Z plane. The projector coordinate system CS1 is changed to a coordinate system reflecting the rotation around the Y axis so as to correspond to the inclination of an angle $\beta$. In the state of this inclination, there is a straight line 8b on the upper side in the Z direction with respect to the optical axis 7 connecting the position P1 of the projection lens 22 of the projector 1 and the position P6 of the projection center 6 of the screen 2, and the position P5 of the virtual viewpoint 5 (first viewpoint) is located on the straight line 8b. For adjustment, a straight line 8c extending from the position P6 of the projection center 6 straightly in the Z direction is set. The position P25 of the second viewpoint 25 is set on this straight line 8c. At the time of adjustment, the shape and orientation of the quadrangular area 147 of the post-transformation virtual camera image 141B of FIG. 16 can be similarly obtained by calculation from such an inclination state and the virtual viewpoint 25. Further, the user can make the same adjustment by using the slide bar B02 of FIG. 17.

(2-6) Adjustment Function—Z Axis

The adjustment function corresponding to the inclination by the rotation around the Z axis is as follows. This adjustment function related to the Z axis can also be realized by basically the same mechanism as the above-mentioned adjustment function related to the X axis. FIG. 19 shows a case where the attitude of the projector 1 is inclined around the Z axis, in other words, there is an inclination by left or right rotation. The upper side of FIG. 19 schematically shows a configuration on the X-Y plane. The projector coordinate system CS1 is changed to a coordinate system reflecting the rotation around the Z axis so as to correspond to the inclination of an angle $\gamma$. In this state, the projected image 3 is also rotated in the X-Y plane by the same angle as the rotation angle $\gamma$ of the projector 1 (or the projection lens 22) with respect to the horizontal plane 80. It is difficult for the user to see the projected image 3 as it is. When making adjustment for the inclined state, the projector 1 sets a straight line 8c (not shown) in the Z direction with respect to the position P6 of the projection center 6 of the screen 2, and sets the position P25 of the second viewpoint 25 (not shown) on the straight line 8c.

The lower side of FIG. 19 shows the process content of step S5C and a post-transformation virtual camera image 141C in the case of making adjustment related to the Z axis.

At the time of adjustment, the shape and orientation of a quadrangular area 148 of the post-transformation virtual camera image 141C can be similarly obtained by calculation from such an inclination state and the virtual viewpoint 25. In this state, the shape of the quadrangular area 148 is a figure having an inclination in the opposite direction at the angle γ in the X-Y plane.

In this case, since the rotation angle γ on the Z axis is obtained, the quadrangular area 148 to be a candidate is rotated in the opposite direction by the angle γ as shown in FIG. 19 when calculating the quadrangular area included in the projectable area 145 before transformation. Consequently, the rotation caused in the projected image 3 due to the inclination can be offset. Further, the user can make the same adjustment by using the slide bar B03 of FIG. 17.

(2-7) Effect

As described above, according to the second embodiment, in addition to the effect of the first embodiment, it is possible to obtain the suitable projected image in which the geometric distortion is eliminated or reduced even when the projector 1 is installed with inclination.

(2-8) Modification—Attitude Sensor

The following is also possible as a modification of the second embodiment. In the second embodiment, the function capable of adjusting the geometric distortion caused by the inclination of the projector 1 by means of the operation by the user through the GUI is shown. In this modification, the projector 1 automatically realizes the adjustment of the geometric distortion caused by the inclination by using the attitude sensor 60 in the sensor of FIG. 3. The projector 1 detects an attitude state including the inclination of the projector 1 by the attitude sensor 60. The attitude sensor 60 is the sensor capable of detecting the state of inclination due to rotation around each axis (X, Y, Z) of the projector 1 in the absolute coordinate system CS0. As an example of the device constituting the attitude sensor 60, a known gravity sensor, acceleration sensor, gyro sensor, electronic compass, or other device or method can be applied. The attitude sensor 60 can detect, for example, the angle α in FIG. 15, the angle β in FIG. 18, and the angle γ in FIG. 19.

Assuming that there is an inclination of the angle α in FIG. 15 as the installation state of the projector 1. In this case, the transformation matrix calculating circuitry 12 of the projector 1 obtains the angle α by using the detection information 160 of the attitude sensor 60. The transformation matrix calculating circuitry 12 determines the shape of the quadrangular area 147 of FIG. 9 in accordance with the angle α of the inclination. Consequently, the projector 1 can automatically correct the geometric distortion without the user operation through the GUI described above.

Third Embodiment

An image display apparatus according to the third embodiment of the present invention will be described with reference to FIG. 20. In each of the above-described embodiments, the image may be projected on any area in the projectable area 145 of the pre-transformation virtual camera image 140 of FIG. 9. Then, the projector 1 calculates the quadrangular area 146 included in the projectable area 145, and uses this area 146 as the image projection area after transformation. However, in an environment where the projector 1 is actually used, an obstacle exists in the projectable area 145 of the screen 2 in some cases. It is preferable if the image can be projected while avoiding the obstacle. For example, when the screen 2 is small, the projectable area 145 protrudes out of the projectable area of the screen 2 in some cases. Further, for example, when the wall surface or the like of a room is used as the screen 2 to project an image, there is an obstacle to be irregularities such as a wall clock on the wall surface in some cases. The projector 1 according to the third embodiment has a function of detecting the obstacle in such a case by image analysis and setting a suitable area so as to avoid the obstacle.

(3-1) Image Analysis

In the third embodiment, the projector 1 uses the image analyzing circuitry 15 of FIG. 3. The image analyzing circuitry 15 analyzes the image 120 from the camera 10, detects an obstacle area and the like, and outputs analysis result information 170. The transformation matrix calculating circuitry 12 calculates the transformation matrix by the use of the analysis result information 170.

(3-2) Process

In the third embodiment, as a change from the first embodiment, the following step S5E is provided instead of step S5. The process of step S5E includes a process of setting the quadrangular area 146 (FIG. 9) so as to avoid an obstacle area by using the image analysis.

FIG. 20 shows the real camera image 120, the pre-transformation virtual camera image 140, the post-transformation virtual camera image 141, and the like in an example in which an obstacle 128 is present on the screen 2 with respect to the process of step S5E in the third embodiment. In this example, there is an area of the obstacle 128 near the upper right of the front surface of the screen 2. The obstacle 128 may be some object, irregularities of a part of the wall surface, or the like. The area of the obstacle 128 has a larger degree of irregularities than the other surface area of the screen 2, and is regarded as not being suitable for image projection. The area of the obstacle 128 is included in the real camera image 120.

The image analyzing circuitry 15 of the projector 1 detects the area of the obstacle 128 based on the real camera image 120 and the distance information 130, and outputs it as the analysis result information 170. The image analyzing circuitry 15 detects the area of the obstacle 128 based on, for example, the color information and contour information of each pixel of the real camera image 120. In the process of detecting the area of the obstacle 128, the image analyzing circuitry 15 may use the distance information 130 calculated by the distance estimator 13 instead of the color information of the real camera image 120. In this case, the projector 1 can detect an area having a large difference in the screen distance 9 such as an area protruding out of the screen 2 or an area having a hole in the wall surface, as the area of the obstacle 128.

The transformation matrix calculating circuitry 12 generates and sets an exclusion area E1 in the projectable area 145 of the pre-transformation virtual camera image 140 in accordance with the area of the obstacle 128. Further, the transformation matrix calculating circuitry 12 sets the exclusion area E1 in the corresponding post-transformation virtual camera image 140. In step S5E, when calculating the post-transformation grid point coordinates VG2, the transformation matrix calculating circuitry 12 calculates a quadrangular area 149 so as to satisfy the condition that it is included in the projectable area 145 and does not include the exclusion area E1.

Since the grid point coordinates CG1 of the real camera image 120 and the grid point coordinates VG1 of the pre-transformation virtual camera image 140 can be calculated by the above procedure, it is possible to perform projective transformation of the image of each area of the real camera image 120 to each corresponding area of the pre-transformation virtual camera image 140. As a result, as shown in FIG. 20, the exclusion area E1 in the pre-transformation virtual camera image 140 can be calculated. In the third embodiment, in the process example of FIG. 13 described above, the determination condition in step S53 is whether the rectangle is included in the projectable area 145 and does not include the exclusion area E1. By this means, the projector 1 can calculate the quadrangular area 149 that does not include the exclusion area E1 in the post-transformation virtual camera image 141. Thereafter, the same process as in the first embodiment may be performed.

(3-3) Effect

As described above, according to the third embodiment, in addition to the effect of the first embodiment, even if there is an obstacle on the screen 2, the suitable projected image 3 without geometric distortion can be obtained in the area where the obstacle is avoided. The following is also possible as a modification of the third embodiment.

When the projected image 3 becomes too small due to avoiding the obstacles, the projector 1 may output a warning or the like to the user through the GUI. For example, the projector 1 calculates the area of the area 149 after the transformation, and obtains a value (area ratio) by dividing the area by the area of the projectable area 145 before the transformation. The projector 1 outputs a warning when the value is equal to or less than the threshold value. The projector 1 confirms whether or not the projectable area (area 149) is set while avoiding the obstacles through the GUI, and determines it in accordance with the operation of the user.

Further, since the projector 1 can know which part of the real camera image 120 has an obstacle, it is also possible to determine in which direction and how much the projector 1 should be moved to obtain a suitable state. Therefore, the projector 1 may make the determination and output guide information to the user through the GUI as to which direction and how much the projector 1 should be moved to obtain a suitable state. The user can put the projector 1 in a suitable state in accordance with the guide information, and can obtain the projected image 3 without any obstacles.

Further, even if there is no obstacle on the screen 2, for example, the projected image may become too small because the screen 2 is inclined too much. Even in such a case, it is possible to output a warning or a guide in the same manner as described above. In this case, the determination can be made, for example, by comparing the area ratio of the projectable area 145 to the pre-transformation virtual camera image 140 with a predetermined threshold value.

Fourth Embodiment

An image display apparatus according to the fourth embodiment of the present invention will be described with reference to FIG. 21. The fourth embodiment further has a function of suitably setting and controlling the configuration of the division number of the grid of the image. In the fourth embodiment, the projector 1 uses two or more division numbers and selects and switches the division numbers as appropriate. The projector 1 suppresses the division number when there is a restriction in processing load or the like with respect to the process including geometric transformation. By this means, the process including geometric transformation can be performed at higher speed.

(4-1) Division Number of Image

In each of the elements in the configuration shown in FIG. 3, the processing amount is particularly large in the geometric transform circuitry 30 because it performs the transformation process using a matrix. Therefore, if the division number is too large with respect to the configuration in which the grid in the image is divided into a plurality of areas as shown in FIG. 7, there is a possibility that the processing amount undesirably becomes too large. Thus, it is preferable to set the division number (referred to as DN) of the grid of the image to an appropriate number in accordance with the resources and performance of the hardware and software mounted in the image display apparatus. For example, when giving priority to the resources and performance of the apparatus, the division number DN may be limited to a small value to some extent. When giving priority to image quality, the division number DN may be set as large as possible. The division number DN is, in other words, the number of areas.

As an example, the case where the maximum division number DN (referred to as DNa) of the image that can be transformed by the geometric transform circuitry 30 is 6×6 in view of the performance of the geometric transform circuitry 30 will considered. Here, when the division number DN (6×6) is small like this, the error when the part of the screen 2 having a high curvature is approximated to a flat plane becomes large, and there is a possibility that distortion remains in the projected image 3. This distortion can be eliminated because the error can be reduced by increasing the division number DN. However, when the division number is limited by the maximum division number DNa, the distortion cannot be reduced.

The fourth embodiment has the following configuration so as to be able to deal with the above cases. The projector 1 uses, in an internal process (in particular, process of the processing circuitry 40), a larger division number DN (referred to as DNb) than the maximum division number DNa (for example, 6×6) in the geometric transform circuitry 30. For example, the maximum division number DN in the internal process is set to the division number DNb=8×8. The virtual camera image is processed as a grid having a plurality of (8×8) areas in accordance with the division number DNb.

In an implementation example, larger numbers having the ratio of division numbers being ½ such as the division number DNa=64×64 and the division number DNb=128×128 can be used. The pattern generating circuitry 32 generates the pattern image 101 corresponding to the division number DN of the image. Further, for example, the values of the division number DN (DNa, DNb) are set in the pattern generating circuitry 32 and the processing circuitry 40. It is possible to change the setting values of the plurality of division numbers DN through the user setting. Basically, it is preferable that the division number DN is set in accordance with the curvature of the curved surface of the screen 2. The different division numbers DN may be set for the X direction and the Y direction.

(4-2) Control Example

A specific example related to the setting and control of the division number DN will be described with reference to FIG.

21. FIG. 21 shows the pre-transformation virtual camera image 140 and the post-transformation virtual camera image 141, and particularly shows the configuration of the grid before and after the culling of the division number with respect to the post-transformation virtual camera image 141. FIG. 21 shows the grid points 142 before culling and the grid points 143 after culling for the rectangular area 146. The culling refers to the change of the division number DN. In this example, it is assumed that the irregularities are dense in the vicinity of the upper left of the screen 2 and the irregularities are coarse in the other parts, for example, in the vicinity of the lower right of the screen 2. In this case, in order to reduce the geometric distortion of the upper left part of the screen 2, it is necessary to make the area divided as finely as possible, but it is not necessary to make the other part so finely divided.

However, the projector 1 cannot determine the state of the distribution of the irregularities in the plane of the screen 2 until the distance information 130 is obtained. Therefore, the projector 1 performs the process of the first half before the distance information 130 is obtained, while setting the division number DN to the maximum division number DNb (=8×8) in the internal process. Specifically, up to step S5 in the flow of FIG. 6, the process is performed with the division number DNb. The grid points 142 before culling are the grid points in the grid having the 8×8 areas corresponding to the division number DNb, and correspond to the above-mentioned post-transformation grid point coordinates VG2. In the rectangular area 146 (corresponding grid), the positions of the vertical dividing lines in the X direction are indicated by x1 and the like, and the positions of the horizontal dividing lines in the Y direction are indicated by y1 and the like.

At the end of step S5, the screen distance 9 for each grid point has been obtained. Therefore, the projector 1 can know in which area of the surface of the screen 2 the irregularities are dense or coarse, from the distance information 130. Therefore, the projector 1 extracts the area where the irregularities of the screen 2 are dense and the area where the irregularities of the screen 2 are coarse, and performs the culling related to the post-transformation grid point coordinates VG2 by controlling the division number DN for those areas. In this example, the transformation matrix calculating circuitry 12 culls some of the vertical and horizontal dividing lines shown by broken lines in the grid points 142 before culling. In this example, the dividing lines at positions x6 and x8 and the dividing line at positions y6 and y8 are culled. As a result, the grid points become like the grid points 143 after culling, and the number of dividing lines as well as the total number of grid points is reduced.

The projector 1 determines which dividing lines are culled in accordance with the density of the irregularities of the surface of the screen 2 (for example, the difference in the screen distance 9). In this example, since the irregularities near the upper left of the surface of the screen 2 are dense and those near the lower right are coarse, the area near the lower right is selected as the target of culling. In the grid points 143 after culling, the number of grid points is reduced and the density is reduced in the area near the lower right, so that the number of areas is reduced and the size of one area is increased. Post-transformation grid point coordinates VG2b are provided in the grid points 143 after culling.

The projector 1 similarly performs the process after step S6 by the use of the post-transformation grid point coordinates VG2b of the grid points 143 after culling described above. In each process, the culling is also reflected in the corresponding grid points. Finally, in step S9, the geometric transform circuitry 30 performs the geometric transformation of the pre-transformation image 110 corresponding to the maximum division number DNa (=6×6). At the time of the above culling, the division number can be selected from the number equal to or smaller than the division number DNa.

(4-3) Effect

As described above, according to the fourth embodiment, in addition to the effect of the first embodiment, a suitable projected image can be obtained in accordance with the priority policy such as image quality or processing load. As another control example of the division number, it is also possible to select and set the division number so that the image frame is evenly divided in accordance with the degree of the curved surface of the screen 2.

In the foregoing, the present invention has been specifically described based the embodiments, but the present invention is not limited to the embodiments described above and can be variously modified within the range not departing from the gist thereof.

REFERENCE SIGNS LIST

1: projector
2: screen
3: projected image
4: image source device
5: virtual viewpoint
6: projection center
7: projector optical axis
8: horizontal line
9: screen distance
10: camera
22: projection lens
P1, P2, P3, P5, P6: position

The invention claimed is:
1. An image display apparatus configured to project an image onto a screen, comprising:
a projection lens arranged at a first position; and
a camera arranged at a second position,
wherein a camera image obtained by capturing a first image projected on the screen by the camera is acquired,
wherein a geometric transformation for correcting a geometric distortion seen from a first virtual viewpoint position is performed for an image to be displayed based on information of the camera image, the first position, and the second position, and a post-transformation image is projected onto the screen,
wherein each point of a grid of a projected image on the screen is calculated by using the first image and the camera image,
wherein a distance from the first position to each point of the grid is calculated,
wherein a transformation matrix for correcting the geometric distortion seen from the first virtual viewpoint position is calculated by using the grid and the distance,
wherein the geometric transformation is performed by using the transformation matrix, and
wherein an obstacle detection is performed based on the camera image, so as to set the post-transformation image that does not include an exclusion area corresponding to an obstacle area detected by the obstacle detection.

2. The image display apparatus according to claim 1,
wherein a virtual camera image seen from the first virtual viewpoint position is calculated by using the camera image and the distance,
wherein, from a first grid corresponding to a projectable area of the virtual camera image, a second grid corresponding to a quadrangular area included in the projectable area is calculated, and
wherein the transformation matrix is calculated by using the second grid.

3. The image display apparatus according to claim 2,
wherein a first transformation matrix indicating a transformation from the virtual camera image to the image to be displayed is calculated,
wherein a third grid corresponding to the post-transformation image is calculated by using the first transformation matrix and the second grid, and
wherein a second transformation matrix indicating a transformation from the image to be displayed to the third grid is calculated as the transformation matrix.

4. The image display apparatus according to claim 2,
wherein the quadrangle is a rectangle.

5. The image display apparatus according to claim 1,
wherein the first image is a pattern image corresponding to a configuration of the grid with a set division number.

6. An image display apparatus configured to project an image onto a screen, comprising:
a projection lens arranged at a first position; and
a camera arranged at a second position,
wherein a camera image obtained by capturing a first image projected on the screen by the camera is acquired,
wherein a geometric transformation for correcting a geometric distortion seen from a first virtual viewpoint position is performed for an image to be displayed based on information of the camera image, the first position, and the second position, and a post-transformation image is projected onto the screen,
wherein a second virtual viewpoint position different from the first virtual viewpoint position is set,
wherein the geometric transformation for correcting the geometric distortion seen from the second virtual viewpoint position is performed based on a difference between the first virtual viewpoint position and the second virtual viewpoint position, and
wherein an obstacle detection is performed based on the camera image, so as to set the post-transformation image that does not include an exclusion area corresponding to an obstacle area detected by the obstacle detection.

7. The image display apparatus according to claim 6,
wherein the second virtual viewpoint position is set in accordance with an inclination of an installation of the image display apparatus in a first coordinate system based on the image display apparatus, with respect to an absolute coordinate system.

8. The image display apparatus according to claim 7, further comprising a sensor configured to detect the inclination.

9. The image display apparatus according to claim 6,
wherein a degree of the geometric transformation when seen from the second virtual viewpoint position is determined based on an operation of a user through a user interface.

10. An image display apparatus configured to project an image onto a screen, comprising:
a projection lens arranged at a first position; and
a camera arranged at a second position,
wherein a camera image obtained by capturing a first image projected on the screen by the camera is acquired,
wherein a geometric transformation for correcting a geometric distortion seen from a first virtual viewpoint position is performed for an image to be displayed based on information of the camera image, the first position, and the second position, and a post-transformation image is projected onto the screen,
wherein an obstacle area in the screen is detected based on the camera image,
wherein each point of a grid of a projected image on the screen is calculated by using the first image and the camera image,
wherein a distance from the first position to each point of the grid is calculated,
wherein a virtual camera image when seen from the first virtual viewpoint position is calculated by using the camera image and the distance,
wherein, from a first grid corresponding to a projectable area of the virtual camera image, a second grid corresponding to a quadrangular area which does not include the obstacle area and is included in the projectable area is calculated, and
wherein the transformation matrix is calculated by using the second grid, and
wherein an obstacle detection is performed based on the camera image, so as to set the post-transformation image that does not include an exclusion area corresponding to an obstacle area detected by the obstacle detection.

11. The image display apparatus according to claim 1,
wherein a division number of the grid is selected from a plurality of division numbers including a set first division number and a second division number smaller than the first division number.

12. An image display method in an image display apparatus configured to project an image onto a screen,
the image display apparatus comprising:
a projection lens arranged at a first position; and
a camera arranged at a second position, and
the image display method comprising:
a step of acquiring a camera image obtained by capturing a first image projected on the screen by the camera; and
a step of performing a geometric transformation for correcting a geometric distortion seen from a first virtual viewpoint position for an image to be displayed based on information of the camera image, the first position, and the second position, and projecting a post-transformation image onto the screen,
wherein each point of a grid of a projected image on the screen is calculated by using the first image and the camera image,
wherein a distance from the first position to each point of the grid is calculated,
wherein a transformation matrix for correcting the geometric distortion seen from the first virtual viewpoint position is calculated by using the grid and the distance,
wherein the geometric transformation is performed by using the transformation matrix, and
wherein an obstacle detection is performed based on the camera image, so as to set the post-transformation image that does not include an exclusion area corresponding to an obstacle area detected by the obstacle detection.

\* \* \* \* \*